United States Patent [19]

Rajagopalan et al.

[11] Patent Number: 5,920,471
[45] Date of Patent: Jul. 6, 1999

[54] METHOD AND APPARATUS FOR AUTOMATIC AVERAGE CURRENT MODE CONTROLLED POWER FACTOR CORRECTION WITHOUT INPUT VOLTAGE SENSING

[75] Inventors: Jayendar Rajagopalan, Santa Clara, Calif.; Paolo Nora, Milan, Italy; Fred C. Lee, Blacksburg, Va.

[73] Assignees: SGS-Thomson Microelectronics, SRL, Milan, Italy; Virginia Tech Intellectual Properties, Inc., Blacksburg, Va.

[21] Appl. No.: 08/921,062

[22] Filed: Aug. 29, 1997

Related U.S. Application Data

[60] Provisional application No. 60/024,878, Aug. 30, 1996.
[51] Int. Cl.$^6$ .......................... H02M 1/12; H02M 5/42; G05F 1/40
[52] U.S. Cl. ........................ 363/89; 363/48; 363/80; 323/288
[58] Field of Search ................... 363/44, 47, 48, 363/74, 80, 81, 89; 323/285, 288, 222

[56] References Cited

U.S. PATENT DOCUMENTS

| | | | |
|---|---|---|---|
| 4,816,982 | 3/1989 | Severinsky | 363/44 |
| 5,095,416 | 3/1992 | Ohms | 363/97 |
| 5,614,810 | 3/1997 | Nostwick et al. | 323/207 |
| 5,617,013 | 4/1997 | Cozzi | 323/207 |
| 5,742,151 | 4/1998 | Hwang | 363/89 |

FOREIGN PATENT DOCUMENTS

WO 93/19514  9/1993  WIPO ................ H02M 3/158

*Primary Examiner*—Peter S. Wong
*Assistant Examiner*—Bao Q. Vu
*Attorney, Agent, or Firm*—McDermott, Will & Emery

[57] ABSTRACT

A method for preparing power factor control integrated circuits which generate linear pulse width modulation (PWM) waveforms is presented. The method of pulse width modulation waveform generation involves providing a capacitor; fast charging the capacitor; and controlling a discharge rate of the capacitor to ensure a constant switching period and a linear PWM waveform. The method is applicable for any single-phase ac/dc converter topology that performs power factor correction. Unlike conventional techniques which utilize three feedback loops, the method of the present invention reduces the total number of feedback loops to two, eliminates input voltage sensing and achieves the same objective. This method results in significant integrated circuit simplification, such as elimination of multiplier, squarer and divider circuits in the control integrated circuit and reduces the cost of the integrated circuit.

22 Claims, 20 Drawing Sheets

METHOD AND APPARATUS FOR AUTOMATIC AVERAGE CURRENT MODE CONTROLLED POWER FACTOR CORRECTION WITHOUT INPUT VOLTAGE SENSING

This application claims benefit of provisional application Ser. No. 60/024,878 filed Aug. 30, 1996.

BACKGROUND OF THE INVENTION

1. Field of the Invention

The present invention relates to power factor correction in pulse width modulation (PWM) converters. In particular, it relates to a feedback control method for average current mode control to achieve power factor correction in PWM converters without input voltage sensing.

2. Description of the Related Art

Average current mode controlled (ACMC) power factor correction techniques utilizing converters operating in continuous conduction mode (CCM) are the primary choice for many medium and high power applications. A popular control technique utilized to implement ACMC is the three loop architecture as disclosed by P. C. Todd in "UC3854 Controlled Power Factor Correction Circuit Design", Unitrode Product and Applications Handbook, 1995–1996, pp. 10–303–322. In accordance with this method, a current programming signal sets the reference for a high bandwidth, fast acting current loop. The amplitude of the current programming signal is slowly modulated by the low bandwidth output voltage error signal and the low pass filtered line voltage rms signal to ensure steady-state input-output power balance. The need for a squarer-divider-multiplier circuit in the control IC to ensure power balance under dynamic changes in load and line rms voltage is explained by L. H. Dixon in "High Power Factor Switching Preregulator Design Optimization", Unitrode Power Supply Design Seminar Manual, SEM 700, 1990. If the current programming signal is not derived from the line explicitly, the advantages in terms of reducing the internal circuitry in the integrated circuit (IC) and external passive components are obvious. Generating the 120 Hz full-wave rectified sine wave current programming signal on-chip is not an attractive solution either.

Methods for achieving high power factor without input voltage sensing for converters operating in CCM have been reported by D. Maksimovic et al., "Nonlinear-carrier Control for High Power Factor Boost Rectifier", APEC 95, pp. 635–641; D. Maksimovic et al., "Nonlinear-carrier Control for High Power Factor Rectifiers based on Flyback, Cuk or Sepic Converters", APEC 96, pp. 814–820; and J. P. Gegner and C. Q. Lee, "Linear Peak Current Mode Control: A Simple Active Power Factor Correction Control Technique for Continuous Conduction Mode", PESC 96, pp. 196–202. Maksimovic et al. utilized the steady-state input-output voltage relationships of boost and flyback topologies along with the average switch current information to derive "non-linear" PWM waveforms that provide high power factor. However, the opportunity of utilizing the average values of other branch currents in the power-stage to derive alternate PWM waveforms was not considered. Moreover, it is exceedingly difficult to design circuits which accurately and consistently produce such "non-linear" PWM waveforms.

Accordingly, there exists a need for an apparatus and method for average current mode control to achieve power factor correction in PWM converters without input voltage sensing, that does not suffer from the foregoing drawbacks.

SUMMARY OF THE INVENTION

An object of the present invention is to provide a control circuit having high power factor correction which does not require input voltage sensing.

Another object of the present invention is to provide a control circuit using a linear pulse width modulation waveform which may be applied to any boost topology to obtain high power factor correction.

Another object of the present invention is to provide a control circuit using a linear pulse width modulation waveform which may be applied to any buck-boost topology to obtain high power factor correction.

Another object of the present invention is to provide a method and apparatus for eliminating the light-load instability problem associated with utilizing a pulse width modulation waveform with variable amplitude.

These and other objects are achieved by the present invention. Accordingly, the present invention relates to a method for preparing a control circuit having high power factor correction.

In one method of pulse width modulation waveform generation, a capacitor is provided and is fast-charged. The discharge rate of the capacitor is then controlled to ensure a constant switching period. According to this method, a pulse width modulator ramp with a variable amplitude is compared with a signal proportional to the average value of input current during the previous switching cycle. The duty ratio is then determined by comparing the pulse width modulator ramp signal to the average value of input current signal.

The methods of the present invention can be applied to any boost topology, buck topology or buck-boost topology known to those skilled in the art.

The present invention provides numerous advantages over prior art devices and methods. For example, as the present invention does not utilize input voltage sensing, it minimizes the number of feedback loops required for performing PFC. Further, the present invention also utilizes linear PWM waveforms, which can be generated readily and consistently, as compared to "non-linear" PWM waveforms currently utilized in known methods. Consequently, the variation of current loop gain magnitude with duty ratio is eliminated. As such, the present invention minimizes the complexity and cost of the overall design. Another advantage of the present invention is that it discloses a method and circuit for eliminating the light-load instability problem associated with utilizing a variable amplitude pulse width modulator ramp, without requiring the use of another external ramp and the related additional circuitry.

Additional advantages associated with the present invention will be readily apparent to those of skill in the art.

The invention itself, together with further objects and attendant advantages, will best be understood by reference to the following detailed description, taken in conjunction with the accompanying drawings.

DESCRIPTION OF THE PREFERRED EMBODIMENTS

Figure 1A:
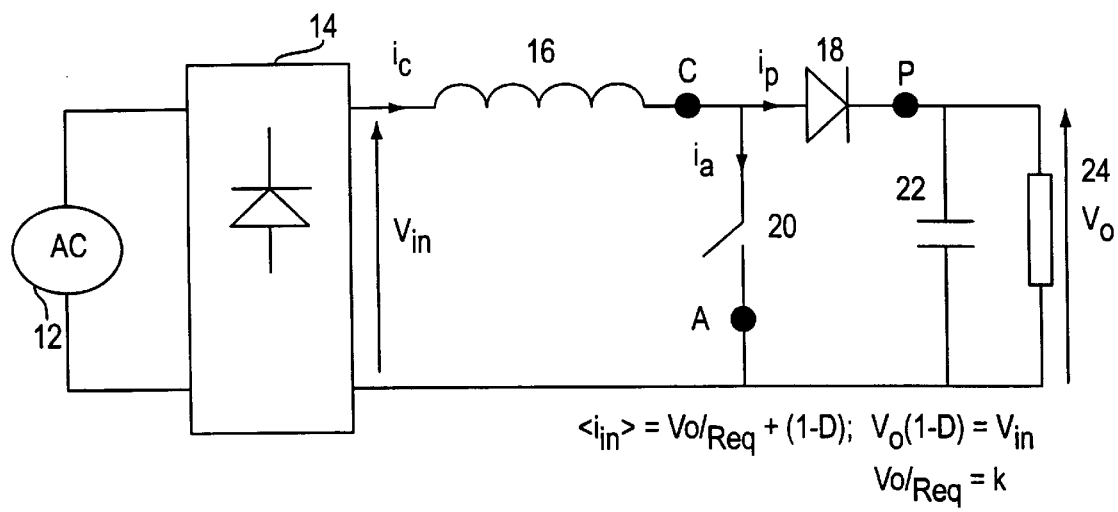
FIG. 1(a) is a schematic of the boost power stage topology for performing power factor correction.

As stated above, the present invention relates to power factor control integrated circuits which generate linear pulse width modulation (PWM) waveforms without input voltage sensing, and which also eliminate light-load instability problems. The present invention is applicable to any single-phase ac/dc converter topology that performs power factor correction. As a preferred embodiment, boost converter topology and buck-boost topology working in CCM can be utilized. The flyback topology provides an example of the buck-boost topology application. Unlike conventional techniques which utilize three feedback loops, the apparatus and method of the present invention reduces the total number of feedback loops to two and achieves the same objective. As a result, the present invention results in significant integrated circuit simplification and reduces the overall cost of the integrated circuit. Application of the present invention involves providing a capacitor; fast charging the capacitor; and controlling a discharge rate of the capacitor to ensure a constant switching period and a linear PWM waveform.

As explained in more detail below, one of the key steps of the present invention is to derive a set of PWM waveforms using the large-signal averaged CCM PWM-switch model for a given power stage topology and then choose the branch currents that yield a suitable PWM waveform. Use is made of the fact that there is a significant time-scale separation between the switching frequency and variation of the full-wave rectified line voltage. The present invention utilizes a pulse width modulation rule based on the steady-state relationships and then verifies that the control rule is being satisfied by using a fast control loop.

In accordance with the present invention, the general 4-step procedure to derive linear PWM waveforms for average current mode controlled PFC can be stated as follows. In Step 1, the objective of PFC is expressed as:

$$<i_{in}> = V_{in}/R_{eq}$$

where $<i_{in}>$ is the average value of input current over a switching period, $V_{in}$ is the instantaneous value of line voltage, and $R_{eq}$ is an equivalent resistance whose magnitude is that of the load, reflected to the input terminals of the boost power stage. In Step 2, the CCM steady-state input-output voltage relationship for the given topology is determined and substituted for $V_{in}$ in the above equation. Step 3 uses a PWM-switch model, such as disclosed by V. Vorperian, "Simplified analysis of PWM converters using the model of the PWM switch: Part I", IEEE Trans. of Aerospace and Electronic Systems, vol. 10, no. 6, Nov. 1995, pp. 659–665, to determine relationships between the a) input current; b) current through the active terminal; c) current through the passive terminal; and d) current through the common terminal. All average quantities are defined over the switching frequency interval. In Step 4, the results of Steps 3 and 2 are substituted into Step 1 and a set of solution candidates are obtained.

There will be multiple candidates for PWM waveforms to achieve the objective of power factor correction. The waveform is chosen based on the following considerations: a) implementation in an integrated circuit; b) current sense considerations; and c) small-signal stability. The time variable t/Ts is substituted for the duty ratio D.

The above methodology can be applied to any topology and also to discontinuous conduction mode ("DCM") of operation. Depending on the power stage topology relationships appropriate relationships between input-output voltages (Step 2) and between the currents (Step 3), a set of control laws that implement average current mode control are obtained. A PWM waveform that is optimal for IC implementation and from small-signal stability consideration is then chosen. The same procedure can be applied to converters operating in DCM such as the BiBRED and the BiFRED simply by using the DCM relationships of currents and voltages in Step 2 and Step 3.

Turning to FIG. 1, the method for deriving linear PWM waveforms for average current mode controlled PFC is illustrated in detail using a boost topology. FIG. 1 illustrates an exemplary schematic of a boost power stage topology with three terminals active (A), passive (P) and common (C) marked to facilitate application of the large-signal averaged PWM-switch model relationships. As shown, the boost power stage comprises an ac power source 12, a rectifier 14, an inductor 16, a diode 18, a switch 20, a capacitor 22 and a load 24, which are coupled together as shown in FIG. 1.

The main objectives of the application of the circuit of FIG. 1 are: to provide high power factor at the input (resistor emulation); and regulation of the output voltage Vo. The high power factor can be expressed using the aforementioned average current mode controlled PFC technique as:

$$<i_{in}>=V_{in}/R_{eq} \quad (1)$$

where $<i_{in}>$ is the average value of input current drawn by the converter in one switching period, $V_{in}$ is the instantaneous value of line voltage, and $R_{eq}$ is an equivalent resistance whose magnitude is that of the load 24, reflected to the input terminals of the boost power stage. By application of the large-signal averaged PWM-switch model relationships:

$$<i_{in}> = <i_c> = \frac{<i_a>}{D} = \frac{<i_p>}{(1-D)} \quad (2)$$

where < > refer to switching frequency averages and D is the duty ratio of the main switch. The duty ratio is calculated as the ratio of the time the active switch is turned on over the entire switching time period. The branch currents are as defined in FIG. 1(a). In this analysis it is assumed that the input voltage is constant over a switching period (quasi-static approach). Given the significant time-scale separation between the switching frequency and the line frequency, this assumption is justified. The steady-state input-output conversion ratio of the boost topology is:

$$V_{in}=V_o(1-D) \quad (3)$$

By substitution of (2) and (3) in equation (1), the following set of equations are derived which satisfy the objectives.

$$<i_{in}> = \frac{V_o}{R_{eq}}(1-D) \quad (4a)$$

$$<i_a> = \frac{V_o}{R_{eq}}(1-D)D \quad (4b)$$

$$<i_p> = \frac{V_o}{R_{eq}}(1-D)^2 \quad (4c)$$

Figure 1B:
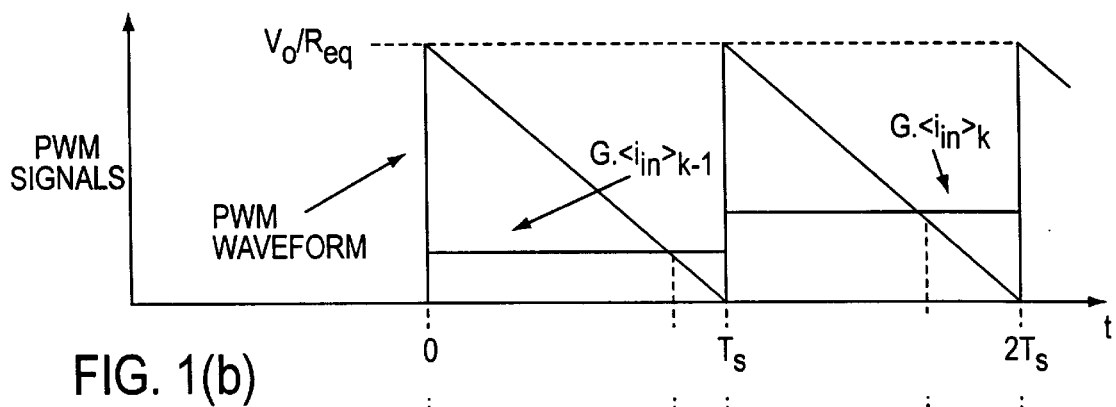
FIG. 1(b) illustrates exemplary linear pulse width modulator waveforms generated in accordance with the present invention for the topology of FIG. 1(a).
Figure 1C:
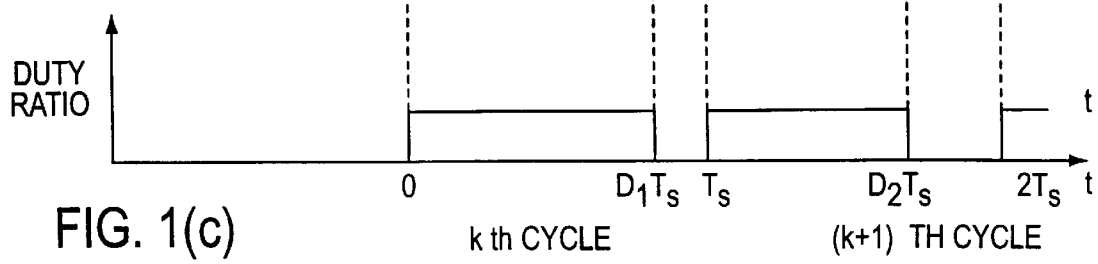
FIG. 1(c) is an exemplary waveform illustrating the duty ratio corresponding to the waveforms of FIG. 1(b).

The first equation (4a) is interpreted as follows: in every switching cycle, if the power switch is turned-off (in the conventional trailing edge modulation sense, with a duty ratio D), when the average value of the input current over an entire switching cycle is equal in value to a waveform whose time variation is given by $(V_o/R_{eq}) (1-t/T_s)$, then resistor emulation is obtained. The graphical interpretation of the above statement is shown in FIGS. 1(b) and 1(c).

As stated, the switch is turned-off when the average value of input current equals the PWM ramp. This control law requires the duty ratio during one switching period to be determined by the average value of current during the entire period. This is not possible in a causal system. However, since the input voltage varies very slowly compared to the switching period, use of the average value of input current during one switching period to determine duty ratio in the next period is justified. As shown in FIG. 1(b), the average current $G<i_{in}>_k$ of the kth cycle is utilized to compute the duty ratio in the kth+1 cycle.

As explained in more detail below, a second method for computing the average current value of the switching period is via a technique referred to herein as trailing-edge-to-trailing-edge integration. In accordance with this method, the value of the average current computed over approximately an entire switching period is available exactly at the time instant when the duty ratio needs to be determined. Thus, there is no need to hold the average current value information from the previous switching cycle.

Figure 2:
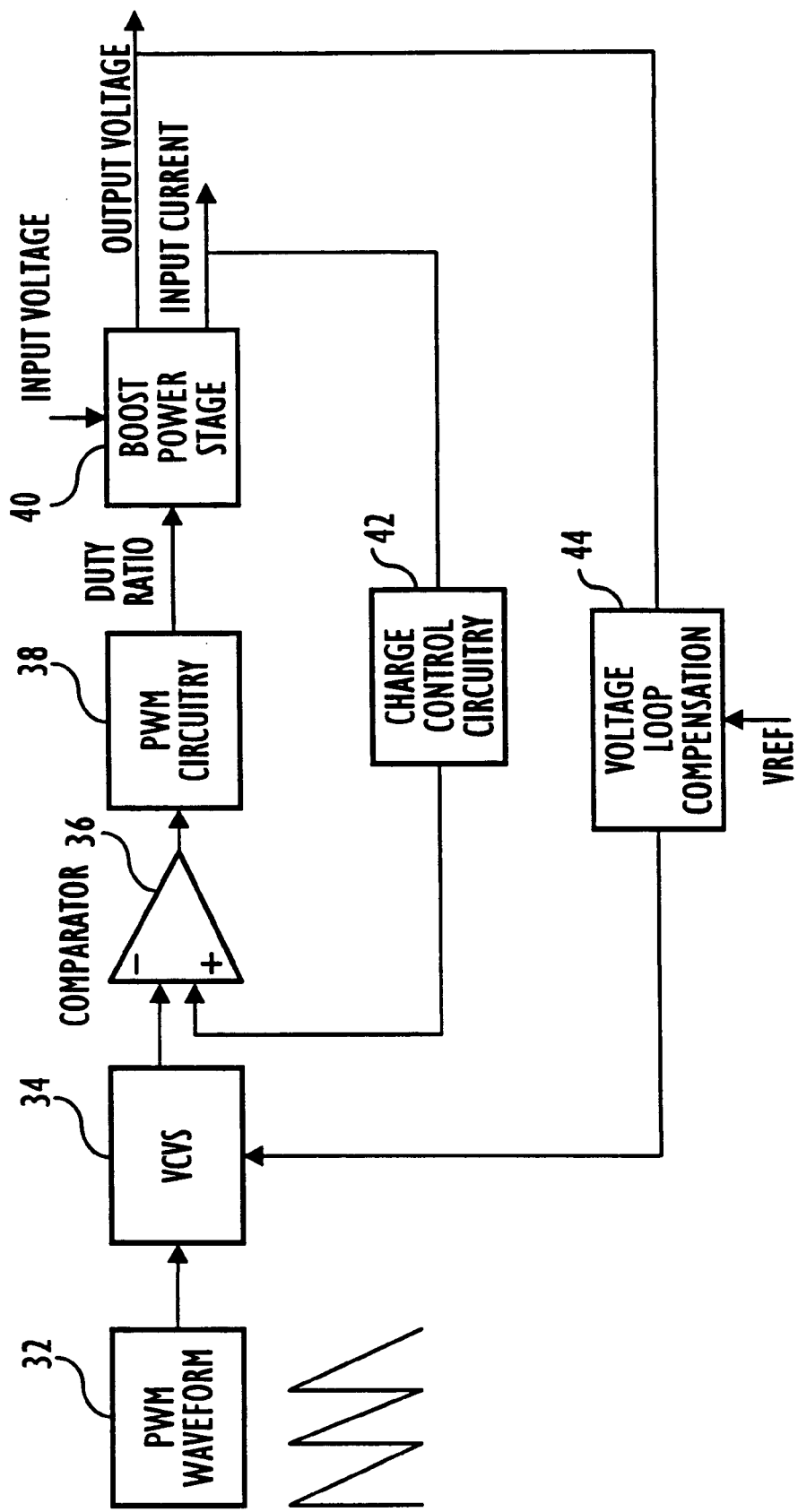
FIG. 2 is a system block diagram illustrating the components of the present invention as applied to a boost converter for power factor correction.

FIG. 2 is a system block diagram illustrating the components of the present invention as applied to a boost converter for power factor correction. As shown therein, the system comprises a PWM waveform generator 32, a voltage controlled voltage source 34 ("VCVS"), a comparator 36, a PWM circuit 38 that generates a square voltage pulse having a width that is a certain fraction of the switching period, and a boost power stage 40. The system also comprises two feedback loops. The first feedback loop comprises a charge control circuit 42 which receives the input current (i.e., the current drawn from the AC power supply) as an input and generates the average current value for a given cycle $G<i_{in}>_k$, which is fed to the comparator 36 as an input signal. The second feedback loop couples the output voltage to the VCVS 32 via a voltage loop compensation circuit 44.

In operation, the PWM waveform generator 32 functions to generate a PWM waveform having a magnitude set by the output of the voltage loop compensation circuit 44 operating in conjunction with the VCVS 32. The output of the VCVS 32 is a PWM waveform, which is coupled to the comparator 36 as one input. The other input to the comparator 36 is the average current level for the previous cycle, which is generated by the charge control circuit 42. The PWM circuit 38 then functions to generate the duty ratio in accordance with the present invention as explained herein. The PWM circuit 38 functions to produce a square-wave pulse having a duty ratio D, that corresponds to the ON time D*Ts of the switch 20 in FIG. 1a by recognizing the start of every new switching period and processing the signals from the comparator. Specifically, the PWM circuit 38 functions: 1) to turn on switch 20 at the beginning of every switching period, 2) to recognize which comparator output transition has to determine the duty ratio D (e.g., by latching the transition), and 3) to blank every other spurious comparator transition. Another function of the PWM circuit 38 is to generate the proper reset signals for the integration/holding capacitor(s) discharge inside the charge control circuitry 42.

Figure 3:
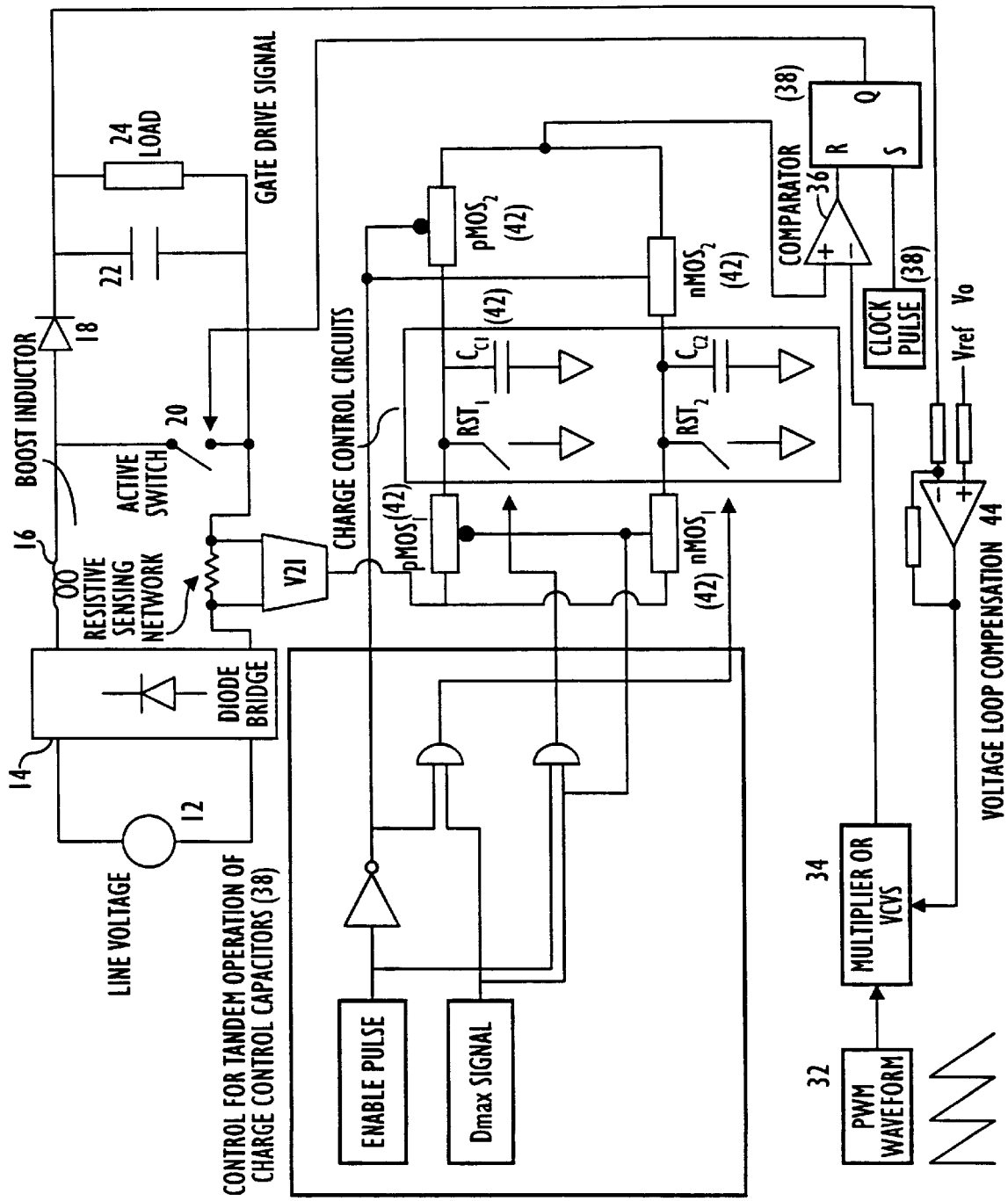
FIG. 3 is a schematic diagram illustrating one embodiment of the charge control circuit and the PWM circuit of the present invention utilized in a boost topology.
Figure 4A:
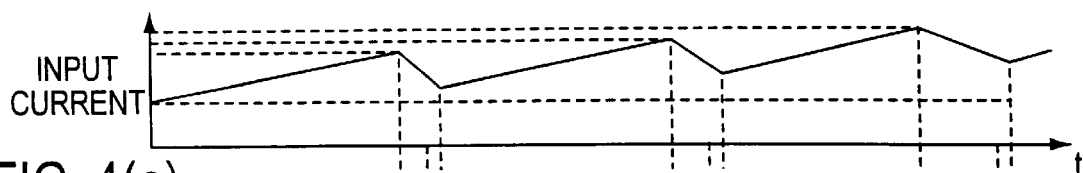
FIG. 4(a)–4(e) illustrate the salient waveforms for the power factor correction circuit of the present invention utilized in a boost topology.
Figure 4B:
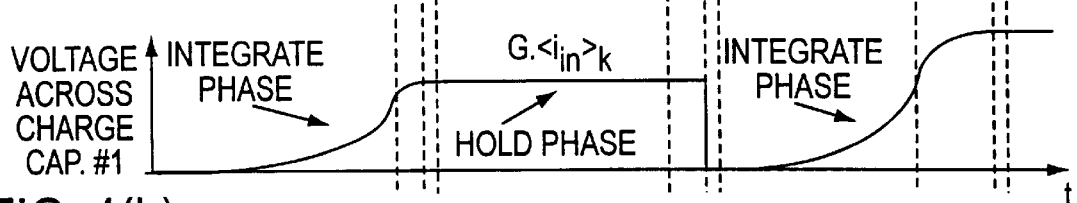
Figure 4C:
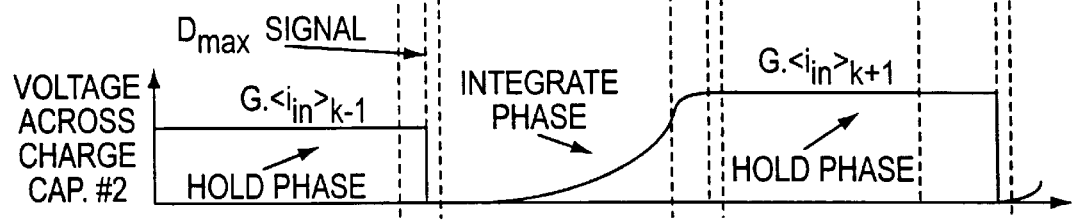
Figure 4D:
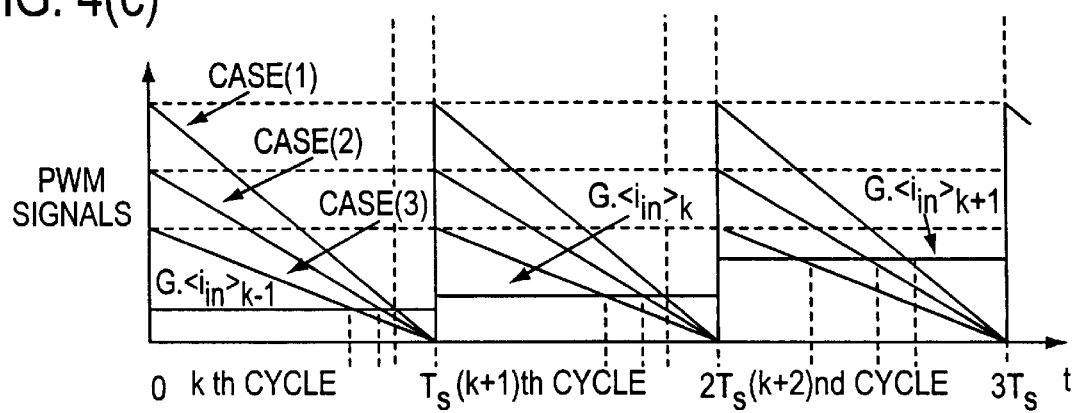
Figure 4E:
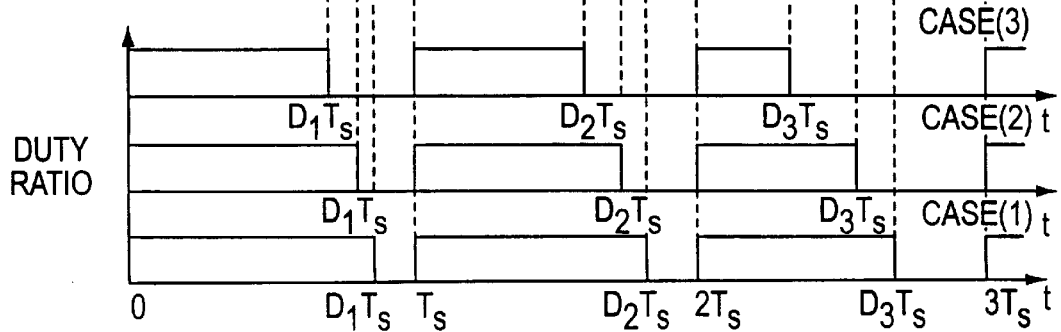

FIG. 3(a) is a more detailed schematic illustrating one embodiment of the charge control circuit 42 and the PWM circuit 38 of the present invention as utilized in the circuit of FIG. 2. The key waveforms associated with operation of the circuit of FIG. 3 are illustrated in FIG. 4. Referring again to FIG. 3, prior to t=0, the capacitor, $C_{c1}$, has been fully discharged and its voltage $V_{c1}$=0. The reset switch is open after the discharge operation and continues to remain so. From t=0 to t=Ts, the input (inductor) current is used to charge the capacitor $C_{c1}$. The charging current determined by a resistive sensing network provides a voltage input to a voltage-to-current (V2I) converter circuit. The V2I converter circuit drives the charge capacitor, $C_{c1}$. The voltage across the charge capacitor $C_{c1}$ is given by:

$$V_{c1} = \frac{R_s \cdot g_m}{C_{c1}} \int_0^{T_s} i_{in} \cdot dt = \frac{R_s \cdot g_m}{C_{c1}} \cdot (i_{in}) \quad (5)$$

where $R_s$ is the current sense resistor gain and $g_n$ is the gain of the V2I converter. At $t=D_{max}T_s$ the charge control circuit discharges charge capacitor $C_{c2}$ and sets the initial conditions correct for the charging and averaging operation from t=$T_s$ to t=$2T_s$. At t=$T_s$ the charge control circuit "holds" the voltage across $C_{c1}$ by causing the gate signals to pMOS1 and pMOS2 to go high and low, respectively. Simultaneously, the gate signals to nMOS1 and nMOS2 are commanded high and low, respectively. During the time interval t=$T_s$ to t=$2T_s$, the held value of voltage across $C_{c1}$ is compared with the PWM ramp waveform to determine the duty ratio. While the waveform of the PWM ramp signal was established by equation 4(a), the dynamics of the signal are shown for 3 cases of output voltage error in FIG. 4(d). These three cases correspond to: (1) large output voltage error, (2) a smaller output voltage error and (2) an even smaller output voltage error. It is noted that the dynamics of the output voltage error signal are determined by the output voltage control loop whose unity gain crossover frequency is about 10–20 Hz.

The foregoing PWM technique is unique in the sense that it uses two control variables, namely duty ratio modulation and PWM ramp amplitude modulation to achieve power factor correction and output voltage regulation, respectively. This is in contrast to conventional PWM techniques where duty ratio modulation is used to achieve both objectives.

Figure 5:
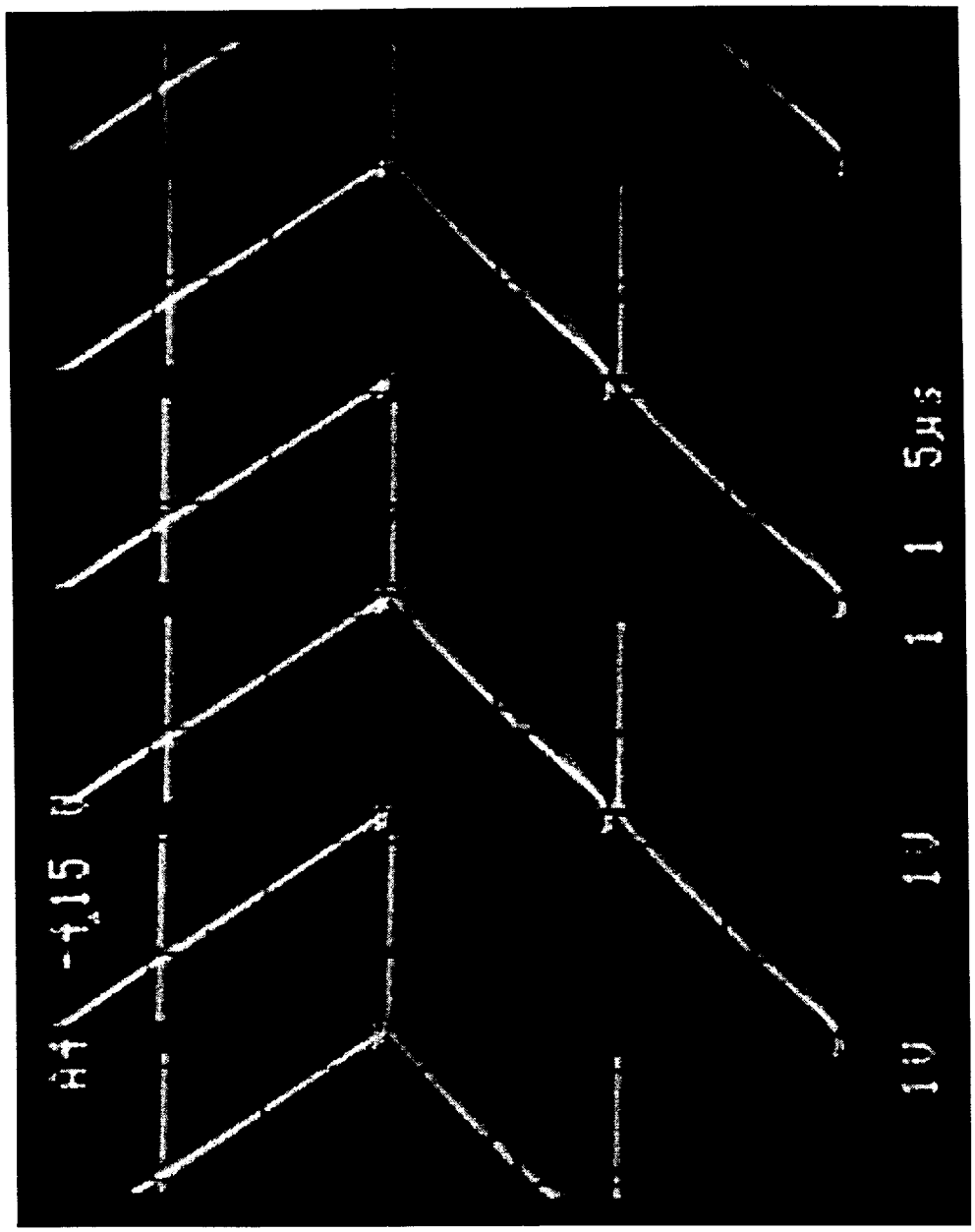
FIG. 5 illustrates key waveforms for boost power factor correction control generated by a prototype of the present invention.
Figure 6:
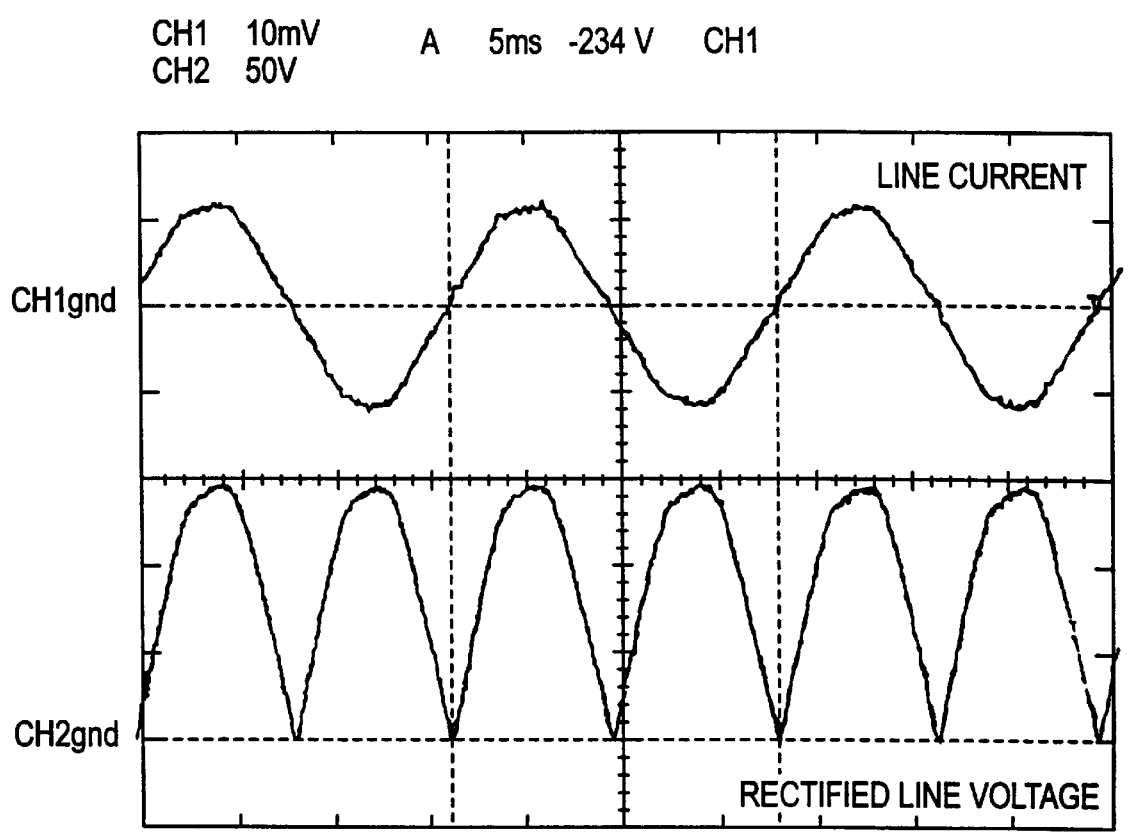
FIG. 6 illustrates the line current and the rectified line voltage of a prototype of the present invention.

FIG. 5 is a snapshot of the PWM ramp signal, the average of input current, and the integrate-and-hold operation of the two charge capacitors. This photograph of operation of the control board prototype captures the variations of the 4 quantities over part of a line cycle. FIG. 6 shows the current drawn from the line and the full-wave rectified line voltage (after the diode bridge).

Figure 7:
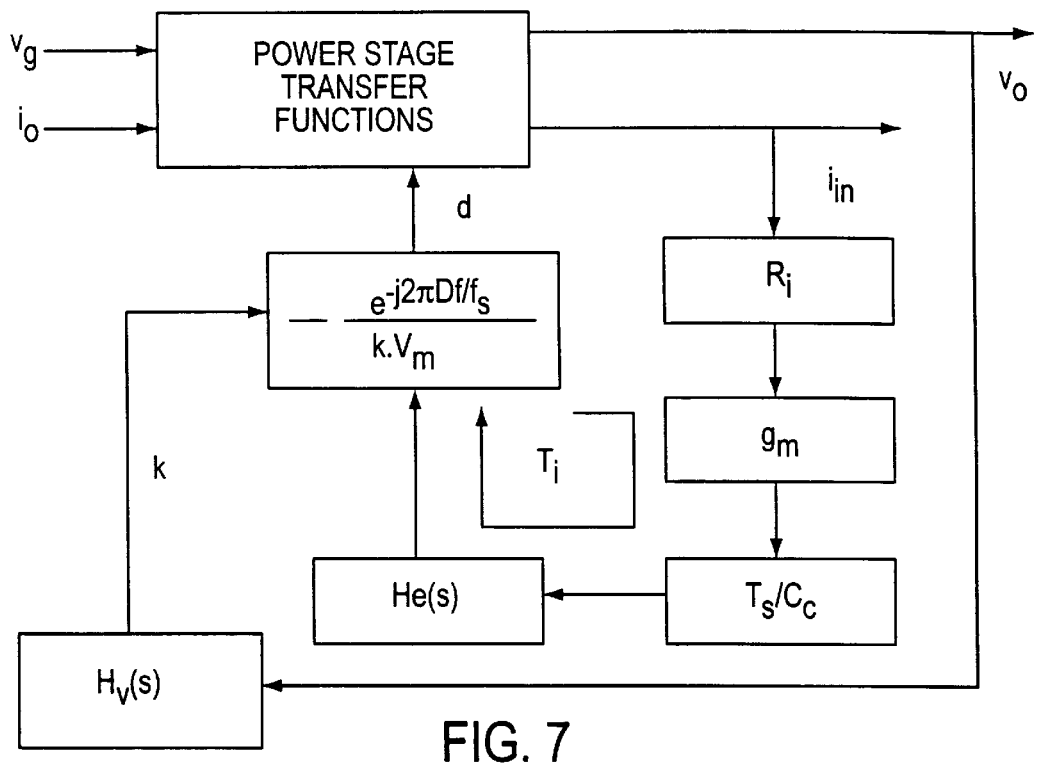
FIG. 7 is a block diagram of the small-signal model for current and voltage loop design of the power factor correction circuit of the present invention.

FIG. 7 is a block diagram of the small-signal model for current and voltage loop design of the power factor correction circuit of the present invention. The current loop gain is given by:

$$Ti=(il/d)R_i g_m(T_s/C_c)He(s)F_m \quad (6)$$

where il/d is the duty-ratio to inductor current transfer function, $R_i$ is the input current sense resistor, $g_m$ is the transconductance of the amplifier which converts the voltage across $R_i$ to a current which charges the integration capacitor $C_c$, $T_s$ is the switching time period, $H_e(s)$ is the continuous-time expression for the sampling effect as defined in R. Ridley, "A new, continuous-time model for current-mode control", IEEE Trans. Power Electron, vol. 6, no. 2, pp. 271–280, 1991, and $F_m$ is the small-signal gain of the PWM modulator.

For the linear PWM waveform utilized in the Boost topology, from geometric considerations, the small-signal gain magnitude of $F_m$ can be derived to be $1/V_m$, where $V_m$ is the amplitude of the PWM ramp. The phase-lag introduced by action of the "hold" circuit is equivalent to the action of a uniformly-sampled modulator. The phase-lag is given by $F_m$=Df/fs*360(deg). The gain k is determined by the magnitude of the output voltage error.

Figure 8B:
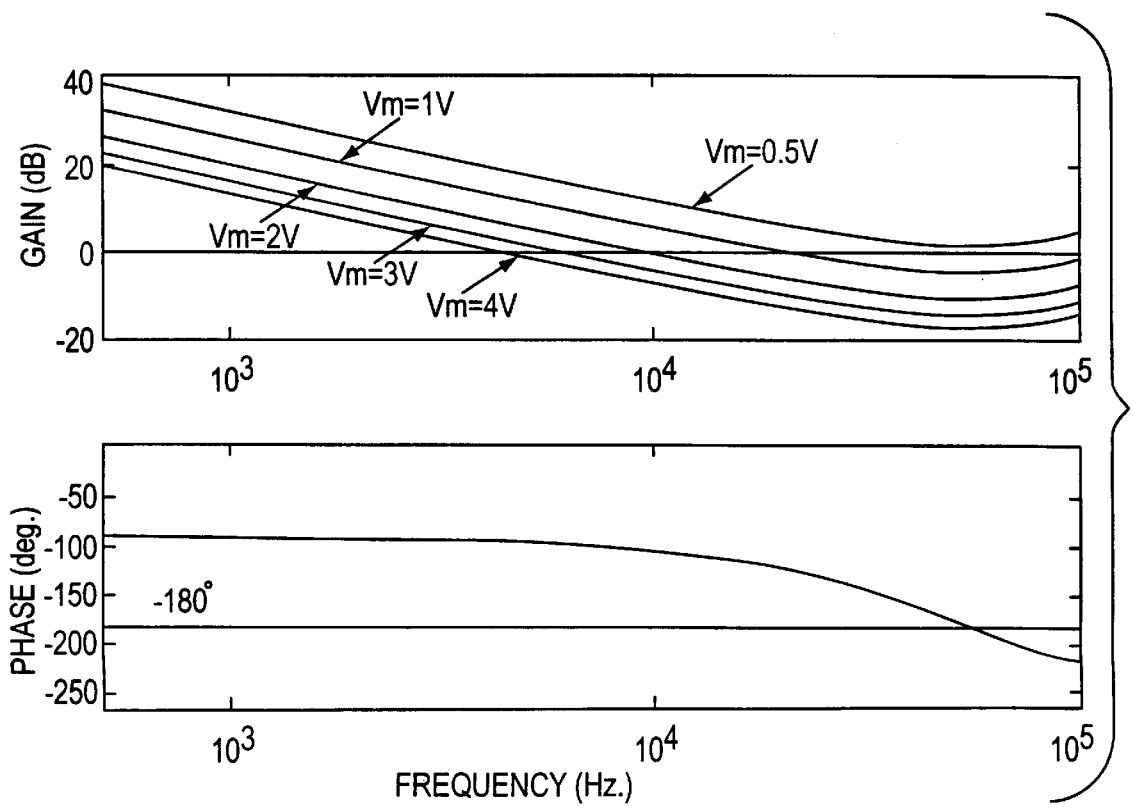
FIG. 8(b) illustrates a specific region of the current loop gain to predict light load instability of the small signal model of the boost power factor correction shown in FIG. 7 at various loads.
Figure 8A:
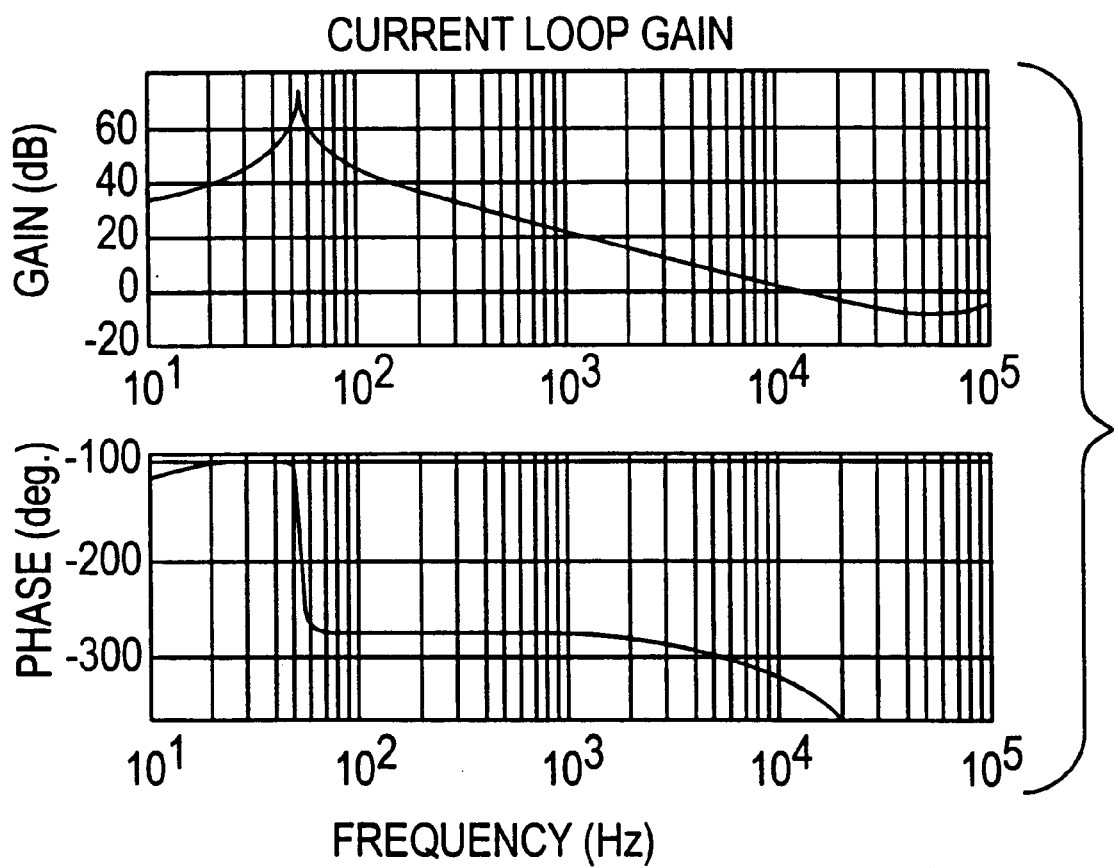
FIG. 8(a) illustrates the current loop gain of the small signal model of the boost power factor correction circuit shown in FIG. 7.

FIG. 8(a) illustrates the current loop gain with a phase margin of 40 degrees (measured w.r.t.−360 degrees), an unity gain crossover frequency of 10 kHz for a converter with a switching frequency of 100 kHz. Converter parameters based on how the current loop gain is computed are: L=1 mH, C=45 OuF, Vo=400V, $R_i g_m$=lm, $C_c$=10 nF, Vm=5V, k=1.

It is also important to note that the relative timing of the integration period with respect to the switching period has a significant impact on the current loop stability. As stated above, the current loop model is shown in FIG. 7. A duty cycle dependent phase delay associated with the "hold" function in the tandem capacitor operation is present. The phase delay is detrimental to the current loop stability, and is worse at large duty cycle values. At light load, the gain and the crossover frequency of the current loop is pushed upwards due to the increase in the PWM modulator gain, which is the inverse of the peak-to-peak amplitude of the PWM waveform, $V_m$ of FIG. 8(b). As a result of the premature phase loss, current loop instability occurs at light load.

In accordance with the present invention, the duty cycle dependent phase delay is eliminated by performing the integration (i.e., average current computation performed by the charge control circuit) between two subsequently turn-OFF events. This technique does not change the result of the integration if periodic steady state operation is utilized. In accordance with this technique, it is unnecessary to hold the integrated value because the turn-OFF event also determines the beginning of a new integration cycle. As a result, the integration capacitor can be reset as soon as the capacitor waveform intersects the PWM waveform, and a new integration cycle is initiated. This improved integration technique also permits for the use of only one integration capacitor, provided that the reset time is kept sufficiently short in comparison to the entire integration period. The foregoing technique is advantageous in part because only one physical component defines the gain of the cycle-by-cycle integration. In the event two capacitors are utilized, the capacitors should be matched so as to prevent a sub-harmonic current at one half of the switching frequency.

Figure 9:
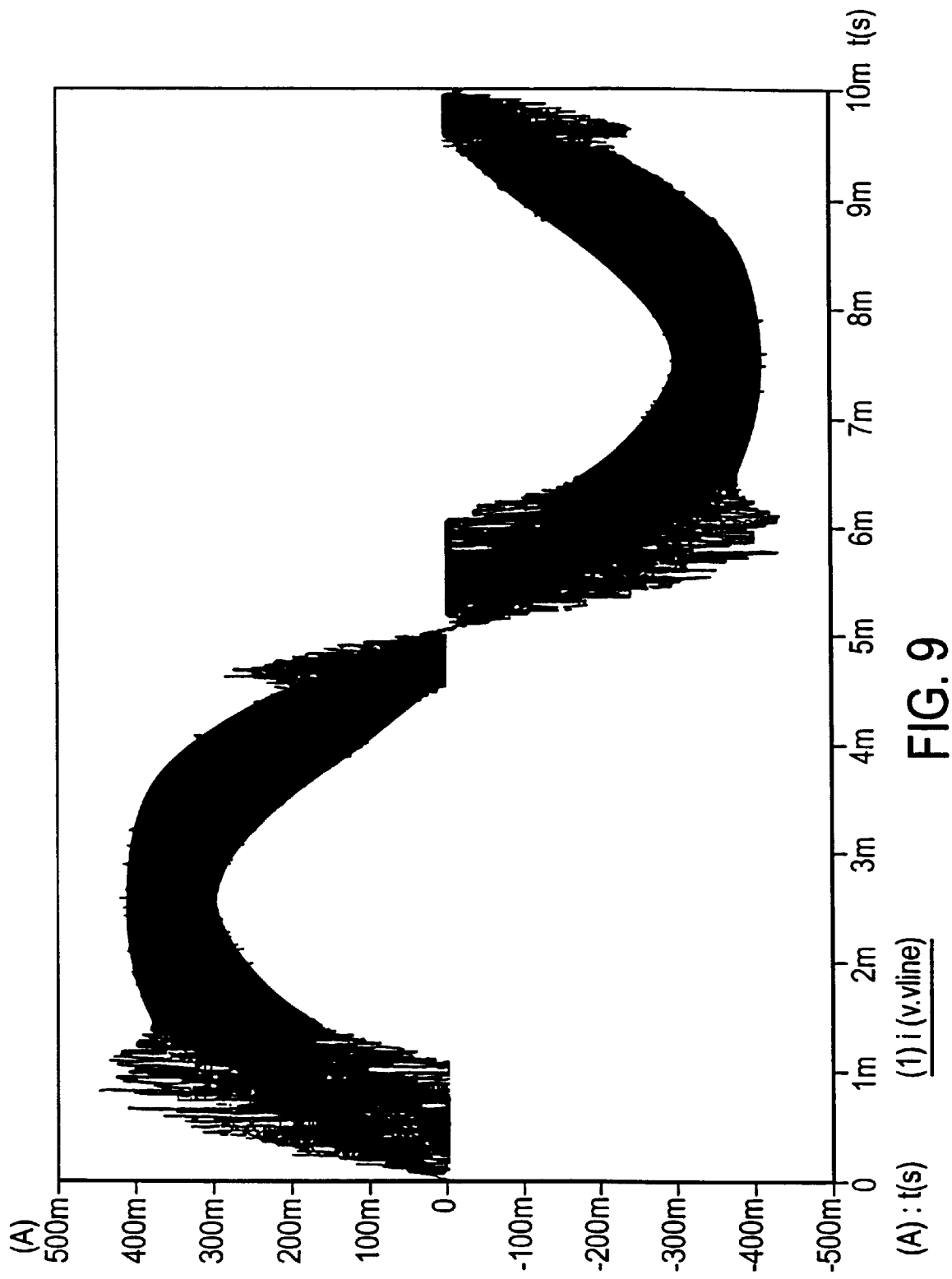
FIG. 9 illustrates the current loop instability at light load.
Figure 10:
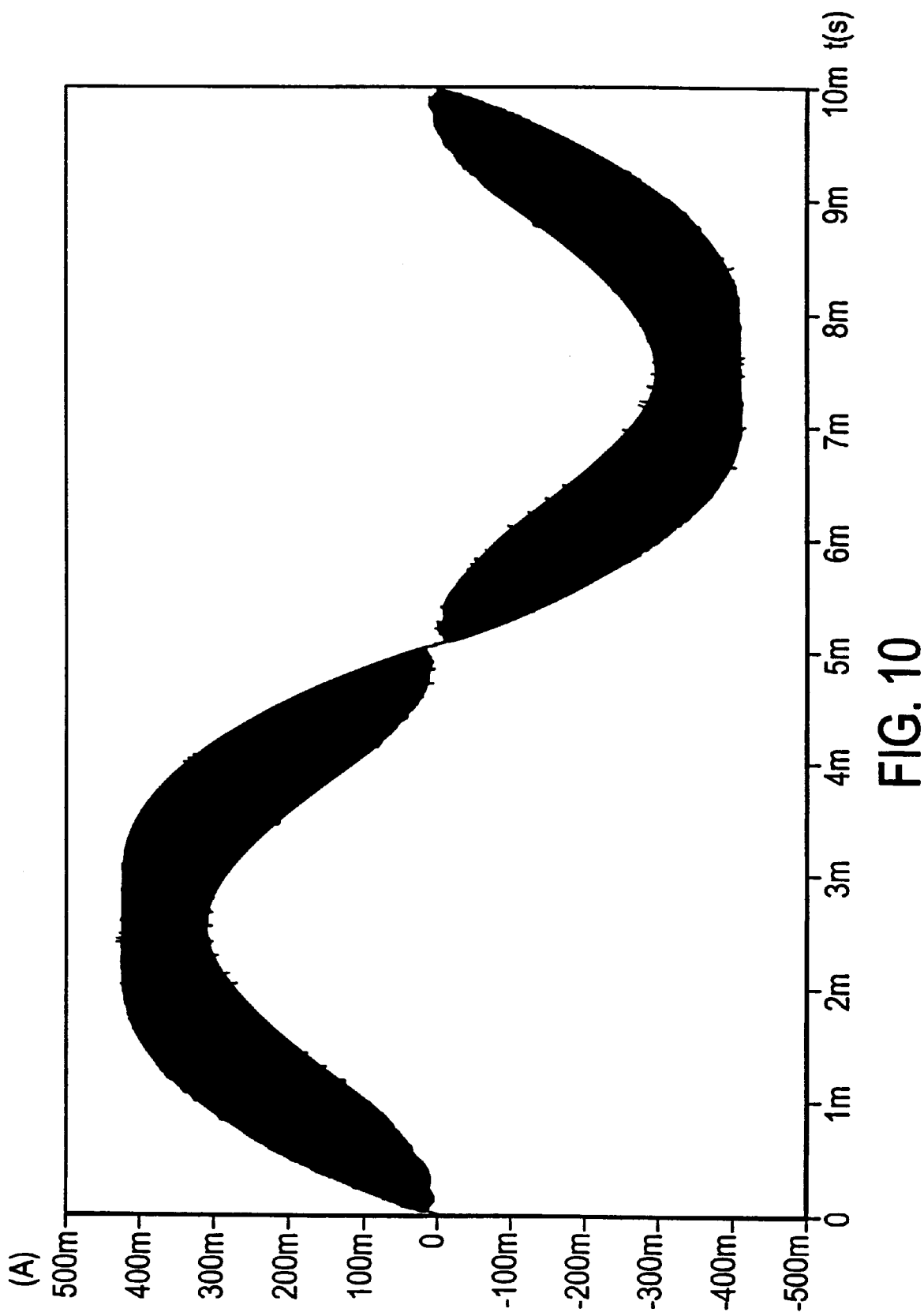
FIG. 10 illustrates how the instability is corrected by utilizing the foregoing technique.
Figure 11A:
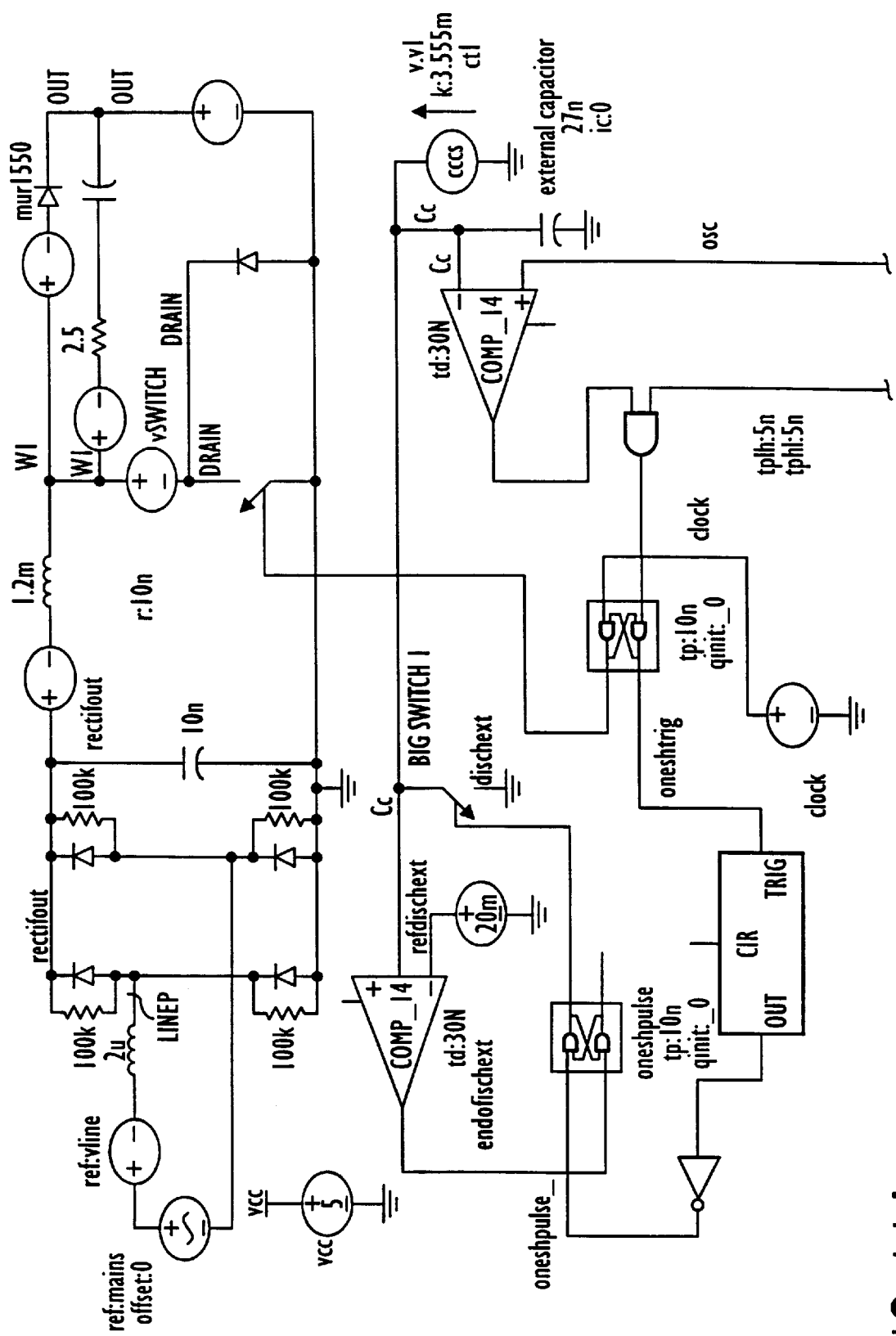
FIG. 11 illustrates an exemplary circuit utilized to perform trailing-edge-to-trailing-integration to compute the average current for a given cycle.
Figure 11B:
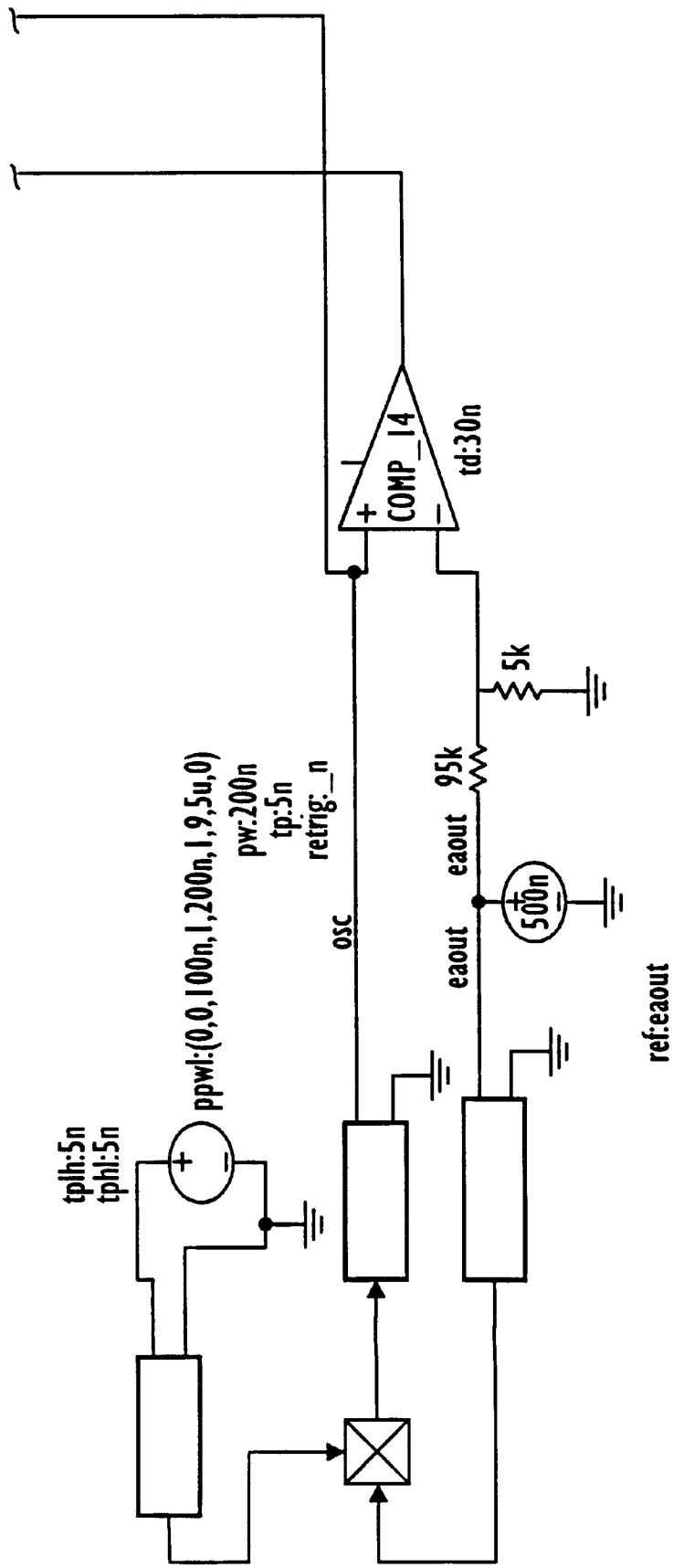

FIG. 9 illustrates the current loop instability at light load. FIG. 10 illustrates how the instability is corrected by utilizing the foregoing technique. FIG. 11 illustrates an exemplary circuit utilized to perform the foregoing technique, namely the trailing-edge-to-trailing-edge integration, utilized to compute the average current drawn during a given cycle. It is noted that if the input voltage changes, a small discrepancy between the switching period and the integration period is introduced, but because the input voltage changes very slowly, the integration period error is negligible.

In FIG. 11, the trailing-edge-to-trailing-edge integration is implemented in a boost PFC. The ammeter voltage source, vl, in series with the 2 mh inductor senses the current. The current controlled current source CCCS is commanded by the ammeter vl. The current gain of the CCCS represents the product of the gains of a resistive sensing network and of a cascaded V2I stage.

In operation, the CCCS charges the external integration capacitor tied to the node "Cc". In order to perform the trailing-edge-to-trailing-edge integration, the capacitor is reset every time the boost converter switch is turned OFF. This event coincides with a low-to-high transition at the node "oneshtrig". This transition triggers a one-shot that generates a pulse at the node "oneshpulse". The pulse initiates the discharge of the external integration capacitor by closing the switch S4. Owing to the NAND latch driven by the signals "oneshpulse_" and "endofdischext," the reset time cannot be any shorter than the programmed duration of the one-shot pulse, but it could be extended, if necessary, until the external capacitor is discharged below some low reference level "refdischext". This level marks the end of the discharge for the external capacitor. The function is implemented by a comparator that resets the NAND latch whenever the capacitor has been completely discharged.

If the capacitor is properly chosen, the capacitor reset time is very small in comparison to the switching period. As a result, the integration capacitor is reset every time the switch is turned OFF, and the computation of the average current value is accomplished between two subsequent turn-OFF events. Thus, the need for holding the signal is eliminated.

A second technique for eliminating current loop stability is to prevent the current loop crossover frequency from increasing beyond a defined point when the load current becomes increasingly smaller. This technique can be implemented with either the two tandem capacitors integrate and hold scheme, or with the trailing edge to trailing edge integration scheme, both of which are described above. In fact, as the presence of $H_e(s)$ can still cause instability by introducing additional phase loss when the current loop bandwidth approaches one half of the switching frequency, it is necessary to place an upper limit on the variation of the current loop bandwidth, even if the aforementioned trailing-edge-to-trailing-edge integration timing is implemented.

Figure 12:
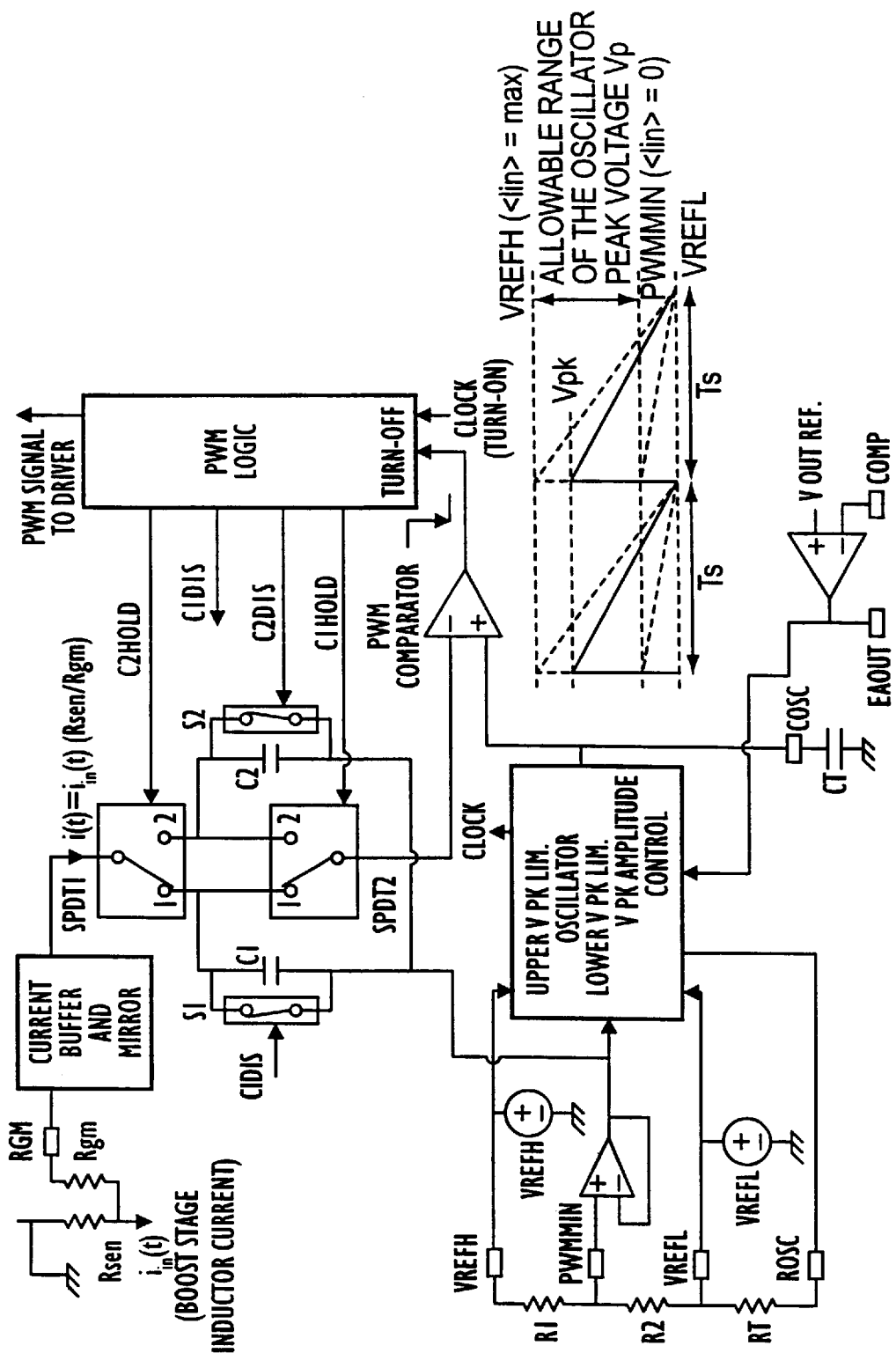
FIG. 12 illustrates one embodiment of an exemplary circuit for eliminating current loop stability at light loads.

This second technique comprises limiting the variation of the amplitude of the PWM ramp waveform. An exemplary circuit for implementing this technique is illustrated in FIG. 12. Referring to FIG. 12, a minimum PWM ramp amplitude is established by deriving a voltage level between the maximum allowed peak voltage of the PWM waveform (VrefH) and the minimum value (VrefL). The offset value is referred to as PWMmin and can be readily programmed by the user in an IC implementation with a single voltage divider (R1-R2 in FIG. 12). The internally generated reference voltages VrefH and VrefL are brought out to the IC pins as outputs, and the voltage at the midpoint of the divider R1-R2 is fed back into the input pin "PWMmin". Thus, the minimum ramp amplitude is PWMmin−VrefL, and the maximum ramp amplitude is VrefH−VrefL. As such, the max./min. amplitude ratio is defined. Specifically, the minimum ramp amplitude corresponds to zero input current, and the maximum ramp amplitude corresponds to full load, low line (i.e., maximum input current).

Figure 13:
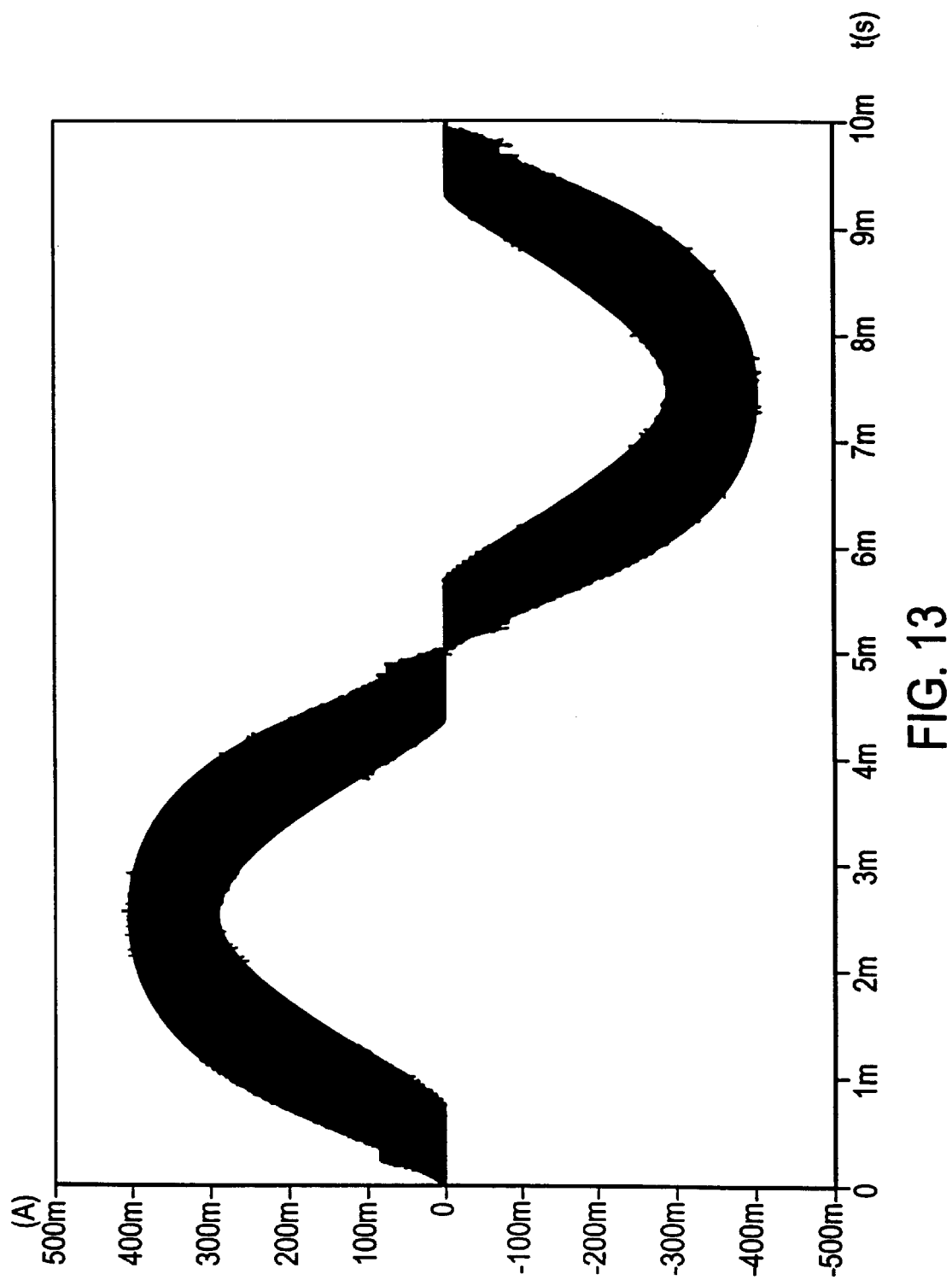
FIG. 13 illustrates the current waveform at light load obtained by utilizing the circuit of FIG. 12.

FIG. 13 illustrates the current waveform at light load with a minimum ramp amplitude. In order to guarantee that the switch is not turned ON when the ramp amplitude is at its minimum, the integration capacitor voltage is shifted upwardly by an amount equal to the offset PWMmin. A zero voltage stored after integration, which corresponds to zero input current, will bring the input of the PWM comparator substantially to the peak of the PWM waveform at the start of the switching cycle, thereby preventing the power switch from being turned ON.

Accordingly, no load operation is enabled with non-zero slope of the PWM ramp amplitude by properly shifting the integration capacitor voltage by the amount corresponding to the minimum peak of the PWM waveform. It is noted that the actual implementation should take into account a voltage shift slightly larger than PWMmin to compensate for the PWM comparator offset.

It is also noted that in a single supply IC implementation, it is necessary to shift the voltage of the integration capacitor because the PWM waveform cannot be implemented with a linear discharge down to zero volts. As such, the shifting function cannot be avoided. The integration capacitor voltage should be shifted by the amount VrefL if the slope of the PWM ramp is allowed to drop down to zero at no load. By shifting the integration capacitor voltage by an amount greater than VrefL, namely PWMmin, the necessary current loop bandwidth limitation at no load is also accomplished.

Figure 14:
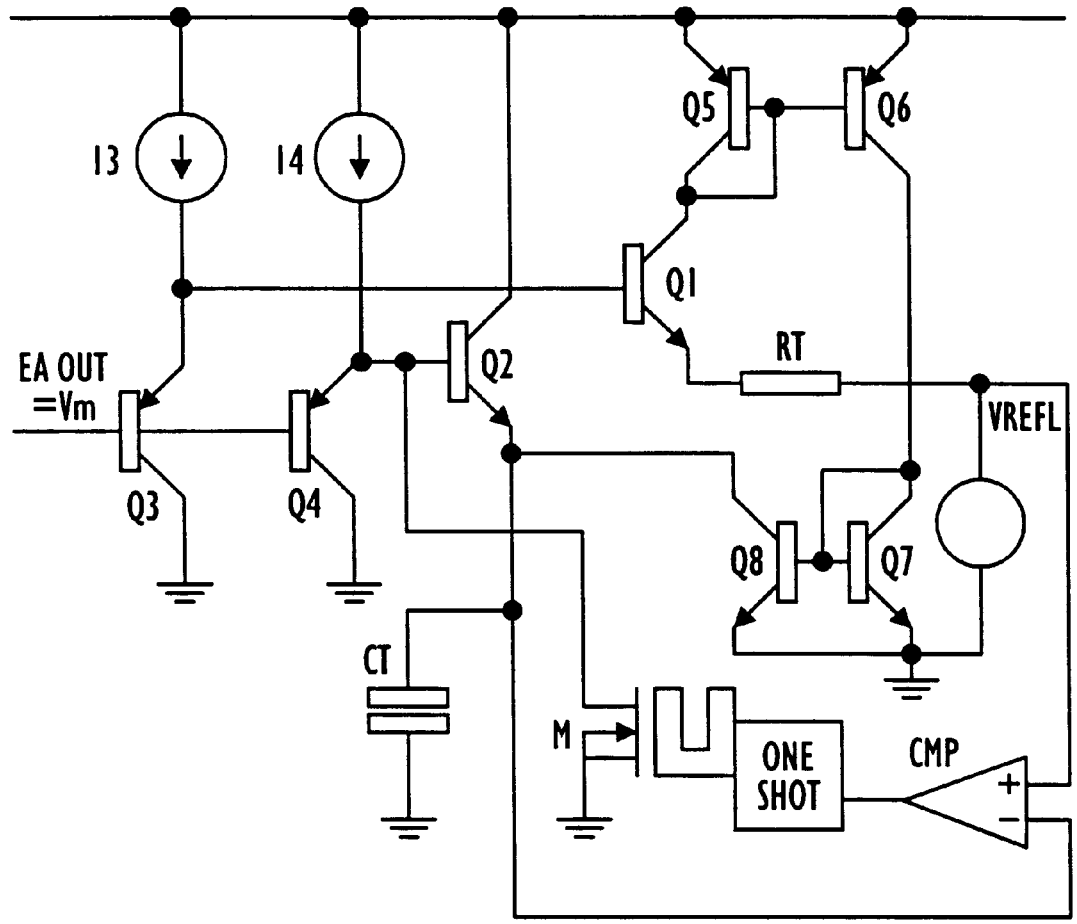
FIG. 14 illustrates an exemplary embodiment of a PWM waveform generation circuit that can be utilized with the circuit of FIG. 12.

One exemplary embodiment of a PWM waveform generation circuit that can be utilized with the foregoing technique, which sets a minimum amplitude for the PWM waveforms, is illustrated in FIG. 14. Referring to FIG. 14, the voltage loop error amplifier output (EA out) directly controls the amplitude of the PWM ramp waveform $V_m$. In order to maintain the operating frequency constant over the entire PWM waveform amplitude range, Q1 and Q2 are matched, Q3 and Q4 are matched, and I3 equals I4.

In operation, transistor pair Q1-Q3 buffers the voltage EA out. The emitter current of Q1 is $(V_m - V_{refL})/R_T$. This current is mirrored by the mirrors Q5-Q6 and Q7-Q8. Assuming that the capacitor CT is initially charged at the voltage value $V_m$, and the MOSFET switch M is initially ON, thereby shorting current I4 to ground and maintaining Q2 (and Q4) OFF, timing capacitor $C_T$ is discharged linearly by the collector current Q8 down to the level VrefL. The discharge time is $R_T * C_T$.

When the timing capacitor voltage reaches VrefL, the comparator CMP triggers thereby turning the switch M OFF for the duration of the oneshot pulse $T_{one-shot}$. Then, the base of Q2 is released and $C_T$ is charged by Q2 to the level $V_m$.

Figure 15:
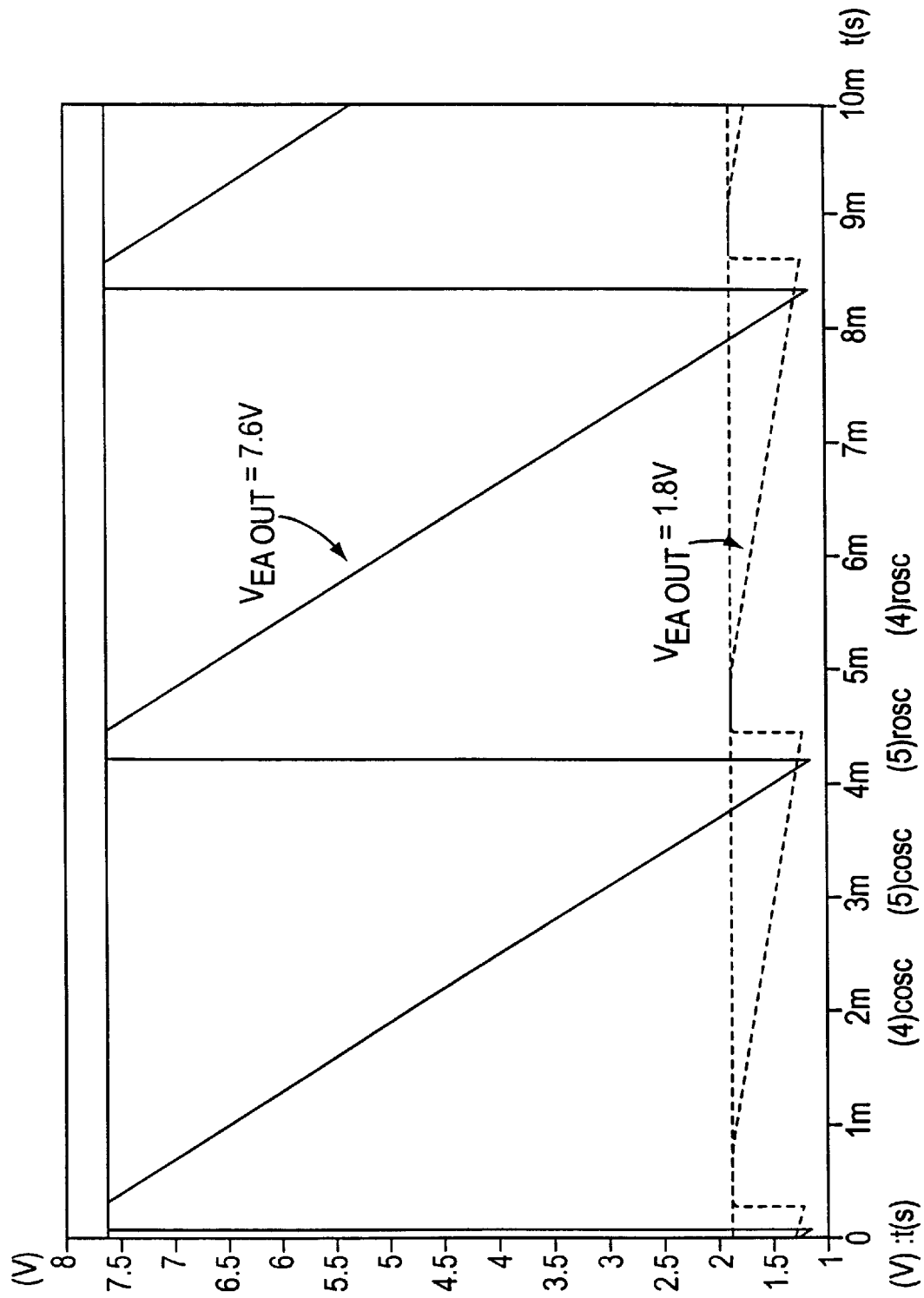
FIG. 15 illustrates the simulation waveforms of the PWM ramp obtained by the circuit of FIGS. 12 and 14.

At the end of the charging phase $T_{one-shot}$, the currents of the transistor pair Q1-Q2 are equal, thereby ensuring equal base-emitter voltage drops. The same is true for transistor pair Q3–Q4. As a result, the emitter voltages of Q1 and Q2 are equal with a high degree of accuracy when the discharge phase is initiated, ensuring frequency stability over the $V_m$ range. If a minimum ramp amplitude is established in accordance with the technique described above, the operating current of Q1 and of the current mirrors will not drop below the value $(PWMmin - V_{refL})/R_T$, which minimizes errors that occur at very low current levels. FIG. 15 illustrates the simulation waveforms of the PWM ramp obtained by this method.

While the foregoing techniques for performing average current mode control to achieve power factor correction in PWM converters without input voltage sensing have been explained in conjunction with a Boost topology, the techniques are suitable for use with various other topologies, including Buck-Boost topologies.

Figure 16:
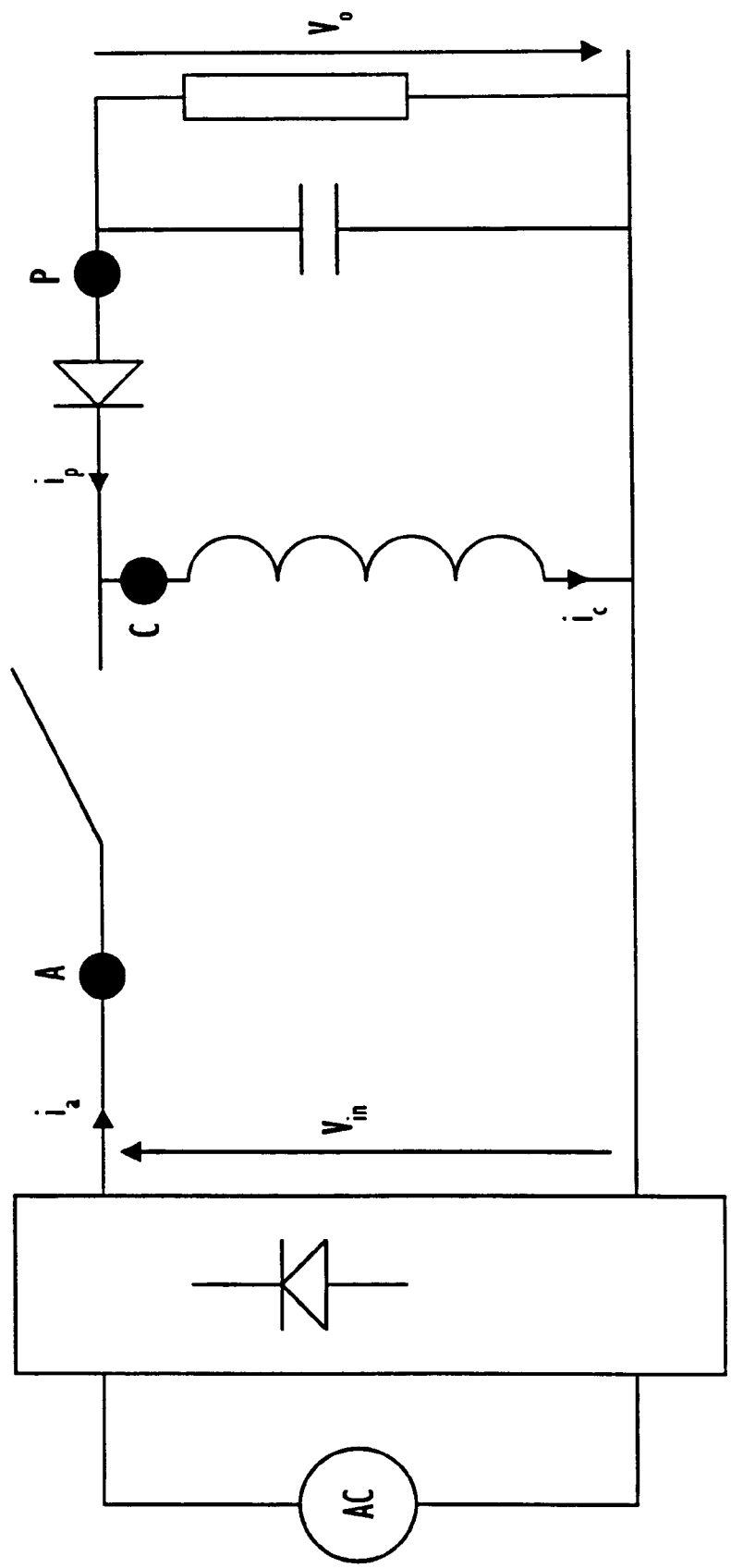
FIG. 16 is a schematic of the buck-boost power stage topology for performing power factor correction.

More specifically, similar to the 4 step procedure derived for boost topologies, the general 4-step procedure can be applied to derive PFC control laws for the buck-boost family of topologies as follows. FIG. 16 illustrates a simple buck-boost topology with the 3 PWM-switch terminals marked as A,C and P. The application of the control law derivation procedure is outlined below.

Step 1: $(i_{in}) = \dfrac{V_{in}}{R_{eq}}$

Step 2: $(i_{in}) = (i_a) = D(i_c) = \dfrac{D}{(1-D)}(i_p)$

Step 3: $V_{in} = V_o \dfrac{(1-D)}{D}$

Step 4: $(i_{in}) = \dfrac{V_o(1-D)}{R_{eq}D}$ $(i_c) = \dfrac{V_o(1-D)}{R_{eq}D^2}$ $(i_n) = \dfrac{V_o(1-D)^2}{R_{eq}D^2}$ The control law chosen is:

$$<i_{in}> = \dfrac{V_o}{R_{eq}}\dfrac{(1-D)}{D}$$

and a simple manipulation yields a simplified control law:

$$\dfrac{t}{T_s}(i_{in}) = \dfrac{V_o}{R_{eq}}\left(1 - \dfrac{t}{T_s}\right)$$

Figure 17A:
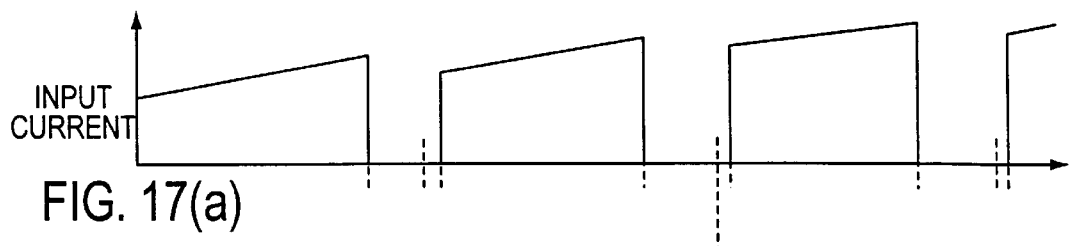
FIG. 17(a)–17(e) illustrate the salient waveforms for the power factor correction circuit of the present invention utilized in a buck-boost topology.
Figure 17B:
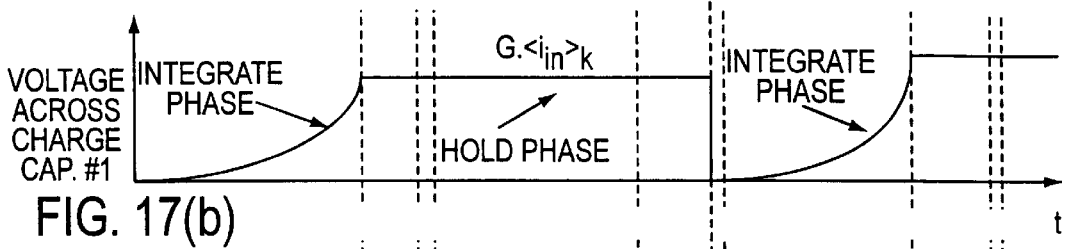
Figure 17C:
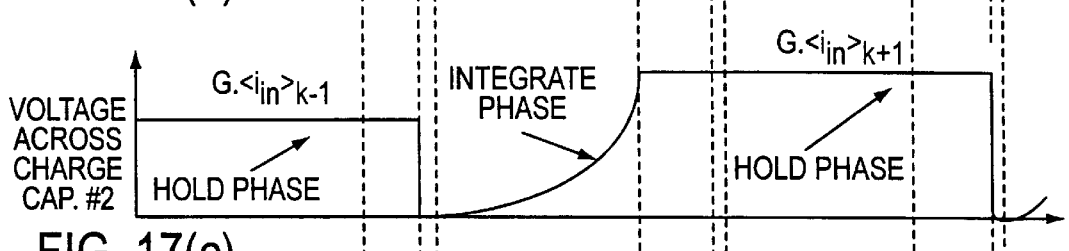
Figure 17D:
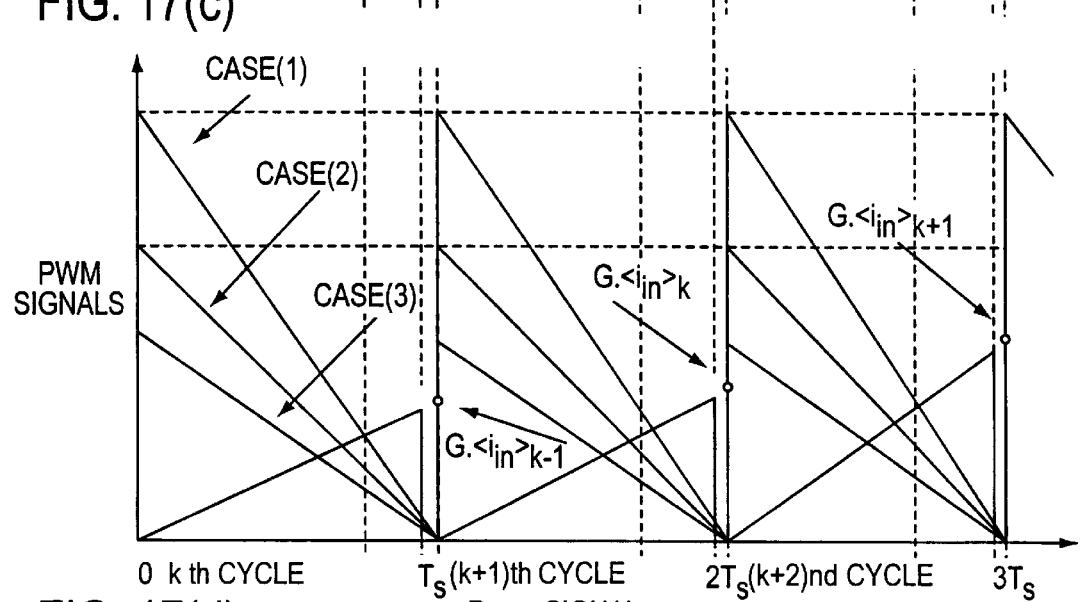
Figure 17E:
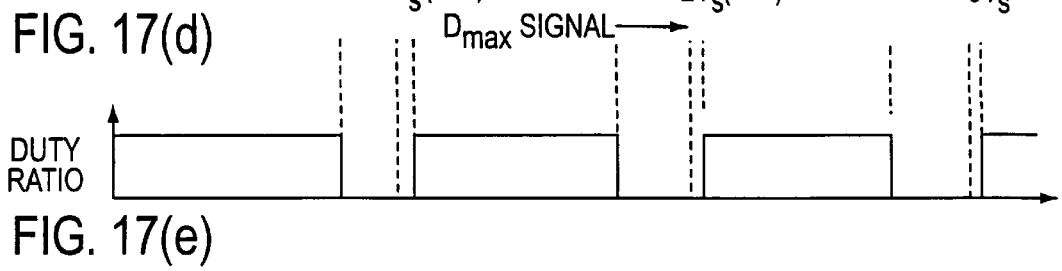

FIGS. 17(a)–17(e) illustrates all the key waveforms associated with the control action. FIG. 17(a) is the input current whose average value is computed by charging the capacitors. As in the case of the boost PFC control strategy, the charge capacitors operate in tandem and the capacitor voltage waveforms are shown in FIGS. 17(b) and 17(c). The right hand side of the foregoing equation is the linearly decreasing ramp voltage waveform ($V_o/R_{eq}$) (1-t/$T_s$) and is similar to the boost topology. The left hand side of the equation, t/$T_s$<$i_{in}$> is a linearly increasing ramp waveform whose amplitude is the average value of input current during the previous switching cycle (held value of capacitor voltage). These two ramp waveforms are the inputs to the PWM comparator that determines the duty ratio.

Figure 18:
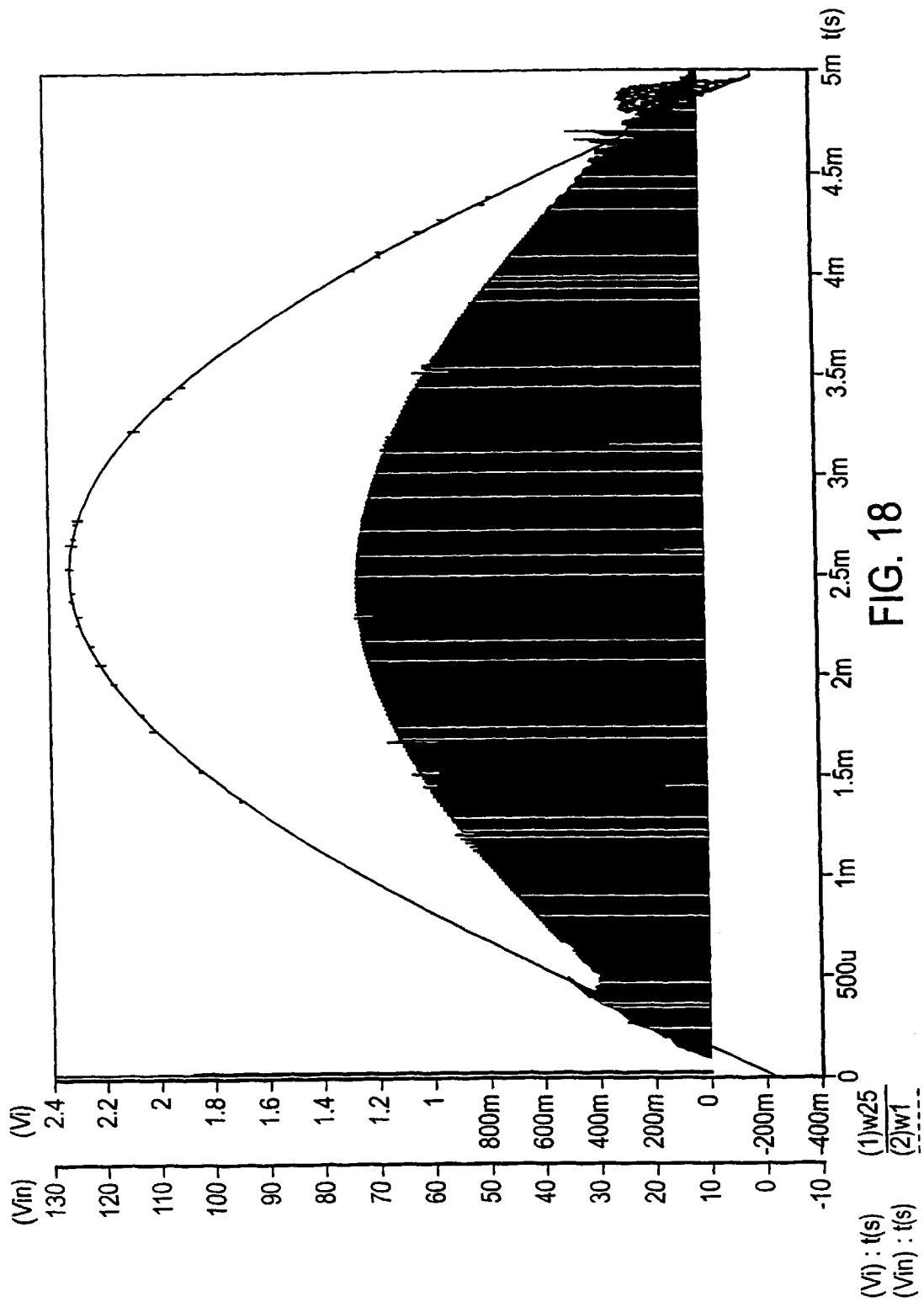
FIG. 18 illustrates the simulation results for a buck-boost power factor correction utilizing the power factor correction circuit of the present invention.

Simulation waveforms of a flyback operation with this new PFC control scheme are shown in FIG. 18. The sensing and control structure is exactly the same as in FIG. 3, except for the linearly rising ramp at the input to the PWM comparator.

Figure 19:
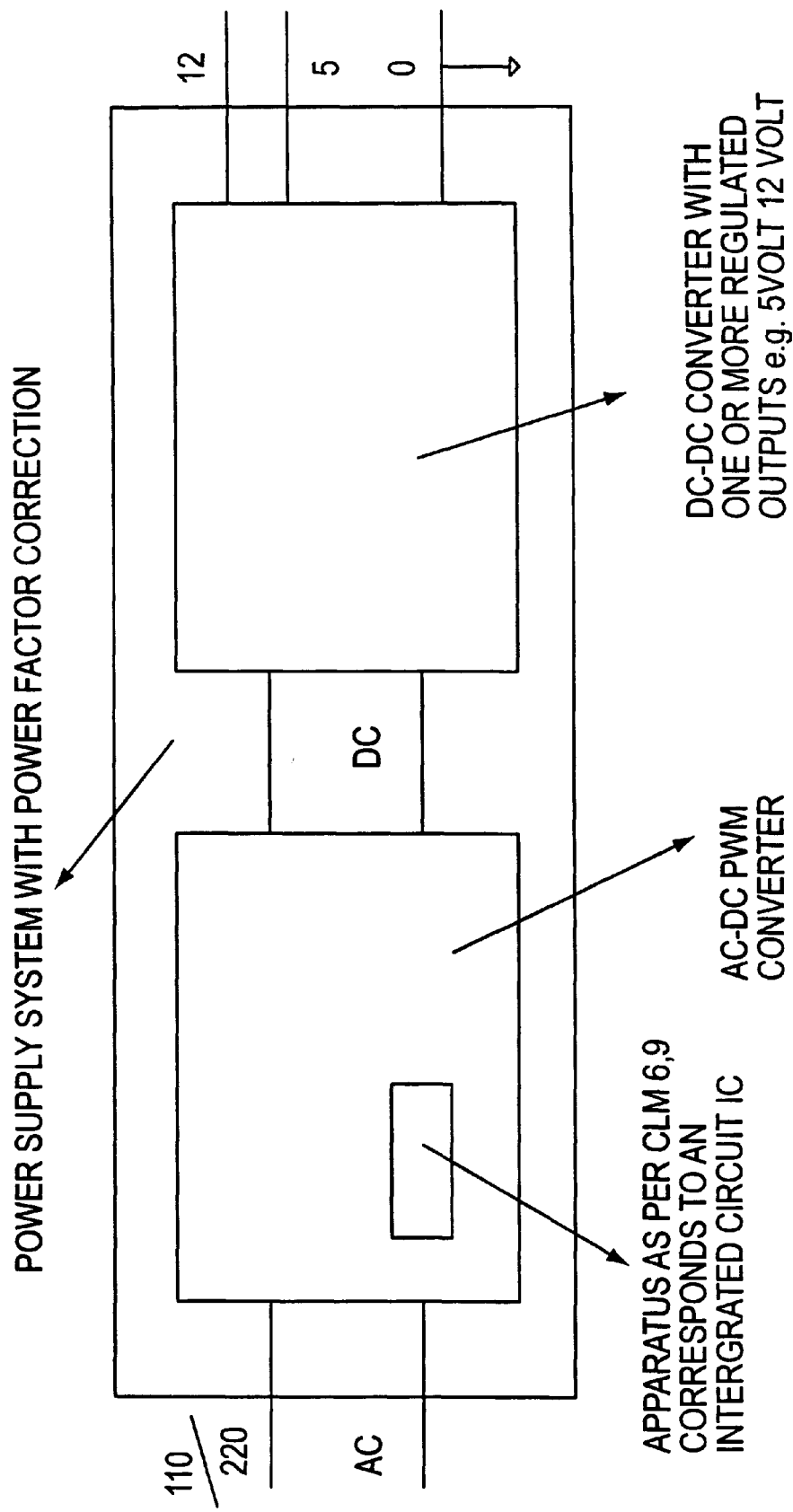
FIG. 19 is a system block diagram providing an overview of how the present invention is incorporated into a power supply system.

FIG. 19 is a system block diagram providing an overview of how the present invention is incorporated into a power supply system. As shown therein, the power supply 60 comprises an AC-DC PWM converter, which incorporates any of the novel PWM converters 62, and which receives an AC voltage supply as an input. The power supply further comprises a DC—DC converter 64 coupled to the output of the AC-DC PWM converter 62. The output of the DC—DC converter is regulated DC voltage sources.

The present invention provides important advantages over the prior art methods and devices. Most importantly, as the present invention does not utilize input voltage sensing, it minimizes the number of feedback loops required for performing PFC. Further, the present invention also utilizes linear PWM waveforms, which can be generated readily and consistently, as compared to "non-linear" PWM waveforms currently proposed in known methods. As such, the present invention, minimizes the complexity and cost of the overall design.

Another advantage of the present invention is that it discloses a method and circuit for eliminating the light-load instability problem associated with utilizing a variable amplitude pulse width modulator ramp, without requiring the use of another external ramp and the related additional circuitry.

Of course, it should be understood that a wide range of changes and modifications can be made to the exemplary embodiments described above. It is therefore intended that the foregoing detailed description be regarded as illustrative rather than limiting and that it be understood that it is the following claims, including all equivalents, which are intended to define the scope of this invention.

What is claimed is:

1. A method of performing power factor correction in pulse width modulation converters, said method comprising the steps of:

initializing a first integration capacitor to a predetermined voltage before the start of a nth cycle of a periodic waveform;

charging said first integration capacitor by an input current during said nth cycle of said periodic waveform;

maintaining the charge stored by said first integration capacitor during a nth+1 cycle of said periodic waveform, said charge having a corresponding voltage; comparing said voltage stored by said first integration capacitor to a linear PWM ramp to determine a duty ratio during said nth+1 cycle of said periodic waveform;

initializing a second integration capacitor to a predetermined voltage before the start of said nth+1 cycle of said periodic waveform;

charging said second integration capacitor by said input current during said nth+1 cycle of said periodic waveform; and maintaining the charge stored by said first integration capacitor during a nth+2 cycle of said periodic waveform, said charge having a corresponding voltage.

2. A method of performing power factor correction in pulse width modulation converters according to claim 1, further comprising the step of:

comparing said voltage stored by said first integration capacitor to a linear PWM ramp to determine a duty ratio during said nth+2 cycle of said periodic waveform.

3. A method of performing power factor correction in pulse width modulation converters according to claim 2, wherein said linear PWM ramp has an amplitude which is proportional to the ratio of an output voltage across a load and a resistance associated with said load.

4. A method of performing power factor correction in pulse width modulation converters according to claim 3, wherein said pulse width modulation converters are utilized in a boost topology.

5. A method of performing power factor correction in pulse width modulation converters, said method comprising the steps of:

initializing an integration capacitor before the start of a nth cycle of a periodic waveform, said initialization occurring during the (n−1)th cycle of said periodic waveform;

allowing the charging of said integration capacitor after said initialization by an input current during said (n−1) th cycle of said periodic waveform;

continuing charging said integration capacitor by an input current during said nth cycle of said periodic waveform;

comparing said voltage stored by said integration capacitor to a PWM ramp decreasing linearly in amplitude during said nth cycle;

determining when said voltage stored by said integration capacitor is equal to said amplitude of said PWM ramp during said nth cycle so as to define a duty cycle; and discharging said integration capacitor during said nth cycle when the voltage stored by said integration capacitor is equal to said amplitude of said PWM ramp;

wherein said linear PWM ramp has an amplitude which is proportional to the ratio of an output voltage across a load and a resistance associated with said load.

6. A method of performing power factor correction in pulse width modulation converters according to claim 5, wherein said pulse width modulation converters are utilized in a boost topology.

7. A method for minimizing light load instability in an average current mode controlled power factor system, said method comprising the steps of:

deriving a voltage level corresponding to a maximum allowable peak of a linear pulse width modulation ramp signal;

deriving a voltage level corresponding to a valley value of said linear pulse width modulation ramp signal;

deriving a voltage level that defines the minimum allowable value of said linear pulse width modulation ramp signal, said minimum allowable value being between said maximum allowable peak value and said valley value of said linear pulse width modulation ramp signal;

shifting a voltage level of an integration capacitor by an amount equal to said minimum allowable value of said linear pulse width modulation ramp signal; and comparing said shifted voltage level to said linear pulse width modulation ramp signal to determine a duty ratio.

8. A method for performing power factor correction in pulse width modulation converters, said apparatus comprising:

generating a first linear PWM ramp signal having an amplitude which is proportional to the ratio of an output voltage across a load and a resistance associated with said load, said first linear PWM signal being a periodic signal;

generating a second pulse width modulation signal exhibiting a linearly increasing amplitude which is proportional to an average input current value of said apparatus determined during a given cycle of said periodic signal; and comparing said first linear PWM ramp signal to said second linear PWM ramp signal to determine a duty ratio.

9. A method for performing power factor correction in pulse width modulation converters according to claim 8, wherein said pulse width modulation converters are utilized in a buck-boost topology.

10. An apparatus for performing power factor correction in pulse width modulation converters, said apparatus comprising:

means for initializing a first integration capacitor to a predetermined voltage before the start of a nth cycle of a periodic waveform;

means for charging said first integration capacitor by an input current during said nth cycle of said periodic waveform;

means for maintaining the charge stored by said first integration capacitor during a nth+1 cycle of said periodic waveform, said charge having a corresponding voltage;

means for comparing said voltage stored by said first integration capacitor to a linear PWM ramp to determine a duty ratio during said nth+1 cycle of said periodic waveform;

means for initializing a second integration capacitor to a predetermined voltage before the start of said nth+1 cycle of said periodic waveform;

means for charging said second integration capacitor by said input current during said nth+1 cycle of said periodic waveform; and means for maintaining the charge stored by said first integration capacitor during a nth+2 cycle of said periodic waveform, said charge having a corresponding voltage.

11. An apparatus for performing power factor correction in pulse width modulation converters according to claim 10, further comprising:

means for comparing said voltage stored by said first integration capacitor to a linear PWM ramp to determine a duty ratio during said nth+2 cycle of said periodic waveform.

12. An apparatus for performing power factor correction in pulse width modulation converters according to claim 11, wherein said linear PWM ramp has an amplitude which is proportional to the ratio of an output voltage across a load and a resistance associated with said load.

13. An apparatus for performing power factor correction in pulse width modulation converters according to claim 12, wherein said pulse width modulation converters are utilized in a boost topology.

14. An apparatus for performing power factor correction in pulse width modulation converters, said apparatus comprising:

means for generating a first linear PWM ramp signal having an amplitude which is proportional to the ratio of an output voltage across a load and a resistance associated with said load, said first linear PWM signal being a periodic signal;

means for generating a second pulse width modulation signal exhibiting a linearly increasing amplitude which is proportional to an average input current value of said apparatus determined during a given cycle of said periodic signal; and means for comparing said first linear PWM ramp signal to said second linear PWM ramp signal to determine a duty ratio.

15. An apparatus for performing power factor correction in pulse width modulation converters according to claim 14, wherein said pulse width modulation converters are utilized in a buck-boost topology.

16. An apparatus for performing power factor correction in pulse width modulation converters, said apparatus comprising:

means for initializing an integration capacitor before the start of a nth cycle of a periodic waveform, said initialization occurring during the (n−1)th cycle of said periodic waveform;

means for allowing the charging of said integration capacitor after said initialization by an input current during said (n−1)th cycle of said periodic waveform;

means for continuing charging said integration capacitor by an input current during said nth cycle of said periodic waveform;

means for comparing said voltage stored by said integration capacitor to a PWM ramp decreasing linearly in amplitude during said nth cycle;

means for determining when said voltage stored by said integration capacitor is equal to said amplitude of said PWM ramp during said nth cycle so as to define a duty cycle; and means for discharging said integration capacitor during said nth cycle when the voltage stored by said integration capacitor is equal to said amplitude of said PWM ramp;

wherein said linear PWM ramp has an amplitude which is proportional to the ratio of an output voltage across a load and a resistance associated with said load.

17. An apparatus for performing power factor correction in pulse width modulation converters according to claim 16, wherein said pulse width modulation converters are utilized in a boost topology.

18. A pulse-width modulation waveform generation circuit comprising:

means for generating a pulse width modulation waveform exhibiting an amplitude that decreases in a linear manner; and means for generating a current which is proportional to the voltage amplitude of said pulse width modulation signal, said current operative for discharging a timing capacitor, said capacitor having a discharging time;

said discharging time of said timing capacitor being independent of the voltage amplitude of said pulse width modulation waveform.

19. A power supply system comprising:

an AC-DC pulse width modulation converter, and a DC—DC converter coupled to said AC-DC pulse width modulation converter, said AC-DC pulse width modulation converter comprising:

means for initializing a first integration capacitor to a predetermined voltage before the start of a nth cycle of a periodic waveform;

means for charging said first integration capacitor by an input current during said nth cycle of said periodic waveform;

means for maintaining the charge stored by said first integration capacitor during a nth+1 cycle of said periodic waveform, said charge having a corresponding voltage;

means for comparing said voltage stored by said first integration capacitor to a linear PWM ramp to determine a duty ratio during said nth+1 cycle of said periodic waveform;

means for initializing a second integration capacitor to a predetermined voltage before the start of said nth+1 cycle of said periodic waveform;

means for charging said second integration capacitor by said input current during said nth+1 cycle of said periodic waveform; and means for maintaining the charge stored by said first integration capacitor during a nth+2 cycle of said periodic waveform, said charge having a corresponding voltage.

20. The power supply system of claim 19, said AC-DC pulse width modulation converter, further comprising:

means for comparing said voltage stored by said first integration capacitor to a linear PWM ramp to determine a duty ratio during said nth+2 cycle of said periodic waveform.

21. The power supply system of claim 20, wherein said linear PWM ramp has an amplitude which is proportional to the ratio of an output voltage across a load and a resistance associated with said load.

22. A power supply system comprising:

an AC-DC pulse width modulation converter, and a DC—DC converter coupled to said AC-DC pulse width modulation converter, said AC-DC pulse width modulation converter comprising:

means for initializing an integration capacitor before the start of a nth cycle of a periodic waveform, said initialization occurring during the (n−1)th cycle of said periodic waveform;

means for allowing the charging of said integration capacitor after said initialization by an input current during said (n−1)th cycle of said periodic waveform;

means for continuing charging said integration capacitor by an input current during said nth cycle of said periodic waveform;

means for comparing said voltage stored by said integration capacitor to a PWM ramp decreasing linearly in amplitude during said nth cycle;

means for determining when said voltage stored by said integration capacitor is equal to said amplitude of said PWM ramp during said nth cycle so as to define a duty cycle; and means for discharging said integration capacitor during said nth cycle when the voltage stored by said integration capacitor is equal to said amplitude of said PWM ramp;

wherein said linear PWM ramp has an amplitude which is proportional to the ratio of an output voltage across a load and a resistance associated with said load.

* * * * *